United States Patent
Kayama

(10) Patent No.: US 11,093,193 B2
(45) Date of Patent: Aug. 17, 2021

(54) INFORMATION PROCESSING DEVICE FOR GENERATING OF A WORKFLOW AND METHOD FOR CONTROLLING THE SAME

(71) Applicant: CANON KABUSHIKI KAISHA, Tokyo (JP)

(72) Inventor: Hiroyuki Kayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/557,850

(22) Filed: Aug. 30, 2019

(65) Prior Publication Data

US 2020/0081676 A1 Mar. 12, 2020

(30) Foreign Application Priority Data

Sep. 7, 2018 (JP) .............................. JP2018-168165

(51) Int. Cl.
*G06F 3/12* (2006.01)

(52) U.S. Cl.
CPC .......... *G06F 3/1275* (2013.01); *G06F 3/1204* (2013.01); *G06F 3/1205* (2013.01); *G06F 3/1253* (2013.01)

(58) Field of Classification Search
None
See application file for complete search history.

(56) References Cited

U.S. PATENT DOCUMENTS

| | | |
|---|---|---|
| 2001/0030755 A1 | 10/2001 | Yamade |
| 2004/0193717 A1 | 9/2004 | Tajima |
| 2009/0006989 A1 | 1/2009 | Park |
| 2009/0097060 A1 | 4/2009 | Okada |
| 2009/0323096 A1 | 12/2009 | Oshima |
| 2010/0028035 A1 | 2/2010 | Nishikata |
| 2012/0206761 A1* | 8/2012 | Uotani ............. G06F 3/126 358/1.15 |
| 2012/0246565 A1* | 9/2012 | Kumamoto ......... G06F 8/38 715/273 |
| 2012/0317156 A1 | 12/2012 | Tomita |
| 2014/0240754 A1 | 8/2014 | Smyth |
| 2015/0221008 A1 | 8/2015 | Kami et al. |

FOREIGN PATENT DOCUMENTS

| | | |
|---|---|---|
| EP | 3113010 A1 | 1/2017 |
| JP | 2014-164765 A | 9/2014 |
| RU | 2574853 C2 | 2/2016 |

* cited by examiner

*Primary Examiner* — Lennin R Rodriguezgonzalez

(74) *Attorney, Agent, or Firm* — Canon U.S.A., Inc., IP Division

(57) ABSTRACT

Information that identifies an order of a plurality of work processes used to produce a product is stored. A parameter for a work process is set and an instruction to add the work process to the plurality of work processes based on user input on a work-process setting screen is issued. In accordance with the information for identifying an order of the plurality of work processes, the work process is added to the plurality of work processes according to the instruction, and a workflow including information regarding the order of the work process and the set parameter for the work process is generated.

16 Claims, 38 Drawing Sheets

FIG. 6A

| PRODUCT ID | PRODUCT NAME | RULE FILE NAME |
|---|---|---|
| ID001 | CUT SHEET | CutSheet01.xml |
| ID002 | SADDLE STITCHED BOOK | SaddleStitching01.xml |
| ID003 | PERFECT BOUND BOOK | PerfectBinding01.xml |

FIG. 6B

CutSeet01.xml

```
<?xml version="1.0"?>
<WorkflowRule>                              6001
    <PartName>Body</PartName>
    <FinishingProcess>                      6002
        <ProcessNo>1</ProcessNo>
        <ProcessID>Cutting</ProcessID>
    </FinishingProcess>
    <FinishingProcess>                      6003
        <ProcessNo>2</ProcessNo>
        <ProcessID>Crease</ProcessID>
    </FinishingProcess>
</WorkflowRule>
```

FIG. 6C

SaddleStitching01.xml

```xml
<?xml version="1.0"?>
<WorkflowRule>
   <PartName>Body</PartName>
   <FinishingProcess>
      <ProcessNo>1</ProcessNo>
      <ProcessID>Cutting</ProcessID>
   </FinishingProcess>
   <FinishingProcess>
      <ProcessNo>2</ProcessNo>
      <ProcessID>Stitching</ProcessID>
   </FinishingProcess>
   <FinishingProcess>
      <ProcessNo>3</ProcessNo>
      <ProcessID>Cutting</ProcessID>
   </FinishingProcess>

<PartName>Cover</PartName>
   <FinishingProcess>
      <ProcessNo>1</ProcessNo>
      <ProcessID>Cutting</ProcessID>
   </FinishingProcess>
</WorkflowRule>
```

FIG. 6D

PerfectBinding01.xml

```xml
<?xml version="1.0"?>
<WorkflowRule>
   <PartName>Body</PartName>
   <FinishingProcess>
      <ProcessNo>1</ProcessNo>
      <ProcessID>Folding</ProcessID>
   </FinishingProcess>
   <FinishingProcess>
      <ProcessNo>2</ProcessNo>
      <ProcessID>Binding</ProcessID>
   </FinishingProcess>
   <FinishingProcess>
      <ProcessNo>3</ProcessNo>
      <ProcessID>Cutting</ProcessID>
   </FinishingProcess>

<PartName>Cover</PartName>
   <FinishingProcess>
      <ProcessNo>1</ProcessNo>
      <ProcessID>Cutting</ProcessID>
   </FinishingProcess>

<PartName>Jacket</PartName>
   <FinishingProcess>
      <ProcessNo>1</ProcessNo>
      <ProcessID>Cutting</ProcessID>
   </FinishingProcess>
   <FinishingProcess>
      <ProcessNo>2</ProcessNo>
      <ProcessID>Crease</ProcessID>
   </FinishingProcess>

...

</WorkflowRule>
```

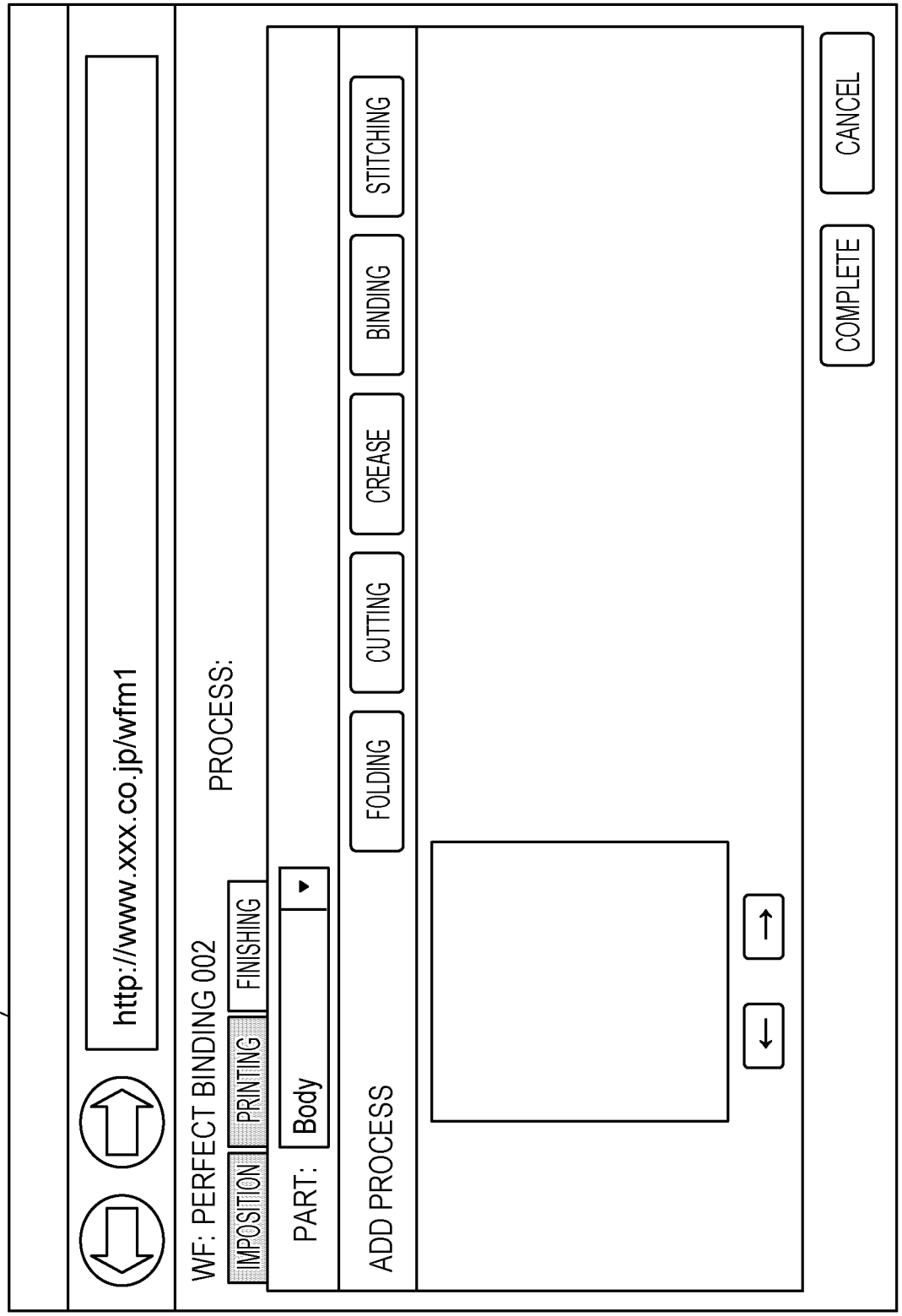

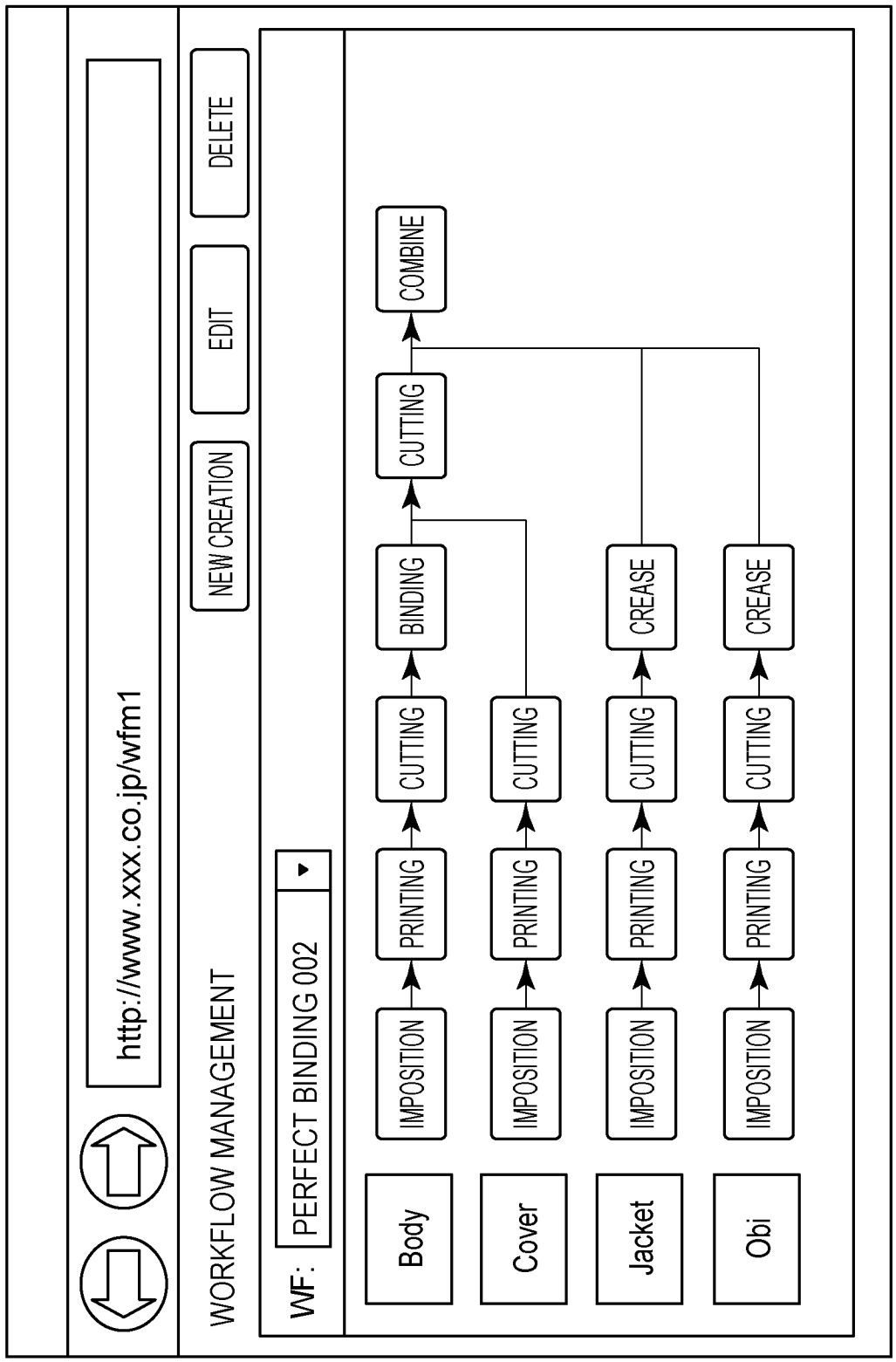

FIG. 10A

| WF ID | WF NAME | WF FILE NAME | |
|---|---|---|---|
| ID1001 | PERFECT BINDING 001 | WF1001.xml | ~1001 |
| ID1002 | SADDLE STITCHING 001 | WF1002.xml | |
| ID1003 | PERFECT BINDING 002 | WF1003.xml | |

FIG. 10B

WF1001.xml

```xml
<?xml version="1.0"?>
<Workflow>
    <Name>PERFECT BINDING001</Name>
    <Type>PerfectBinding</Type>
    <Part>                                          /‎10001
        <PartName>Body</PartName>
        <Process>                                   /‎10002
            <ProcessNo>1</ProcessNo>
            <ProcessID>Folding</ProcessID>          /‎10003
            <Param>                                 /‎10004
                <PaperSizeWidth>100</PaperSizeWidth>
                <PaperSizeHeight>297</PaperSizeWidth>
                ...
            </Param>
        </Process>
        <Process>
            <ProcessNo>2</ProcessNo>
            <ProcessID>Binding</ProcessID>
            <Param>
                <BodyPaperSizeWidth>100</PaperSizeWidth>
                <BodySizeHeight>297</PaperSizeWidth>
                ...
            </Param>
        </Process>
    <Part>
    <Part>
        <PartName>Cover</PartName>
        <Process>
            <ProcessNo>1</ProcessNo>
            <ProcessID>Cutting</ProcessID>
            <Param>
                <PaperSizeWidth>210</PaperSizeWidth>
                <PaperSizeHeight>297</PaperSizeWidth>
                ...
            </Param>
        </Process>
    <Part>
    ...
</Workflow>
```

FIG. 12A

| PRODUCT ID | PRODUCT NAME | RULE FILE NAME |
|---|---|---|
| ID001 | CUT SHEET | CutSheet01.xml |
| ID002 | SADDLE STITCHED BOOK | SaddleStitching01.xml |
| ID004 | PERFECT BOUND BOOK | PerfectBinding02.xml |

FIG. 12B

CutSeet01.xml

```
<?xml version="1.0"?>
<WorkflowRule>
    <PartName>Body</PartName>
    <FinishingProcess>
        <ProcessNo>1</ProcessNo>           12001
        <ProcessID>Cutting</ProcessID>     12002
        <Required>false</Required>
        <AutoSetList>                      12003
            <ParamName>PaperSize</ParamName>
            <ParamName>FinishingSize</ParamName>
        </AutoSetList>
    </FinishingProcess>
    <FinishingProcess>
        <ProcessNo>2</ProcessNo>
        <ProcessID>Crease</ProcessID>
        <Required>false</Required>
    </FinishingProcess>
</WorkflowRule>
```

FIG. 12C

SaddleStitching01.xml

```xml
<?xml version="1.0"?>
<WorkflowRule>
   <PartName>Body</PartName>
   <FinishingProcess>
      <ProcessNo>1</ProcessNo>
      <ProcessID>Cutting</ProcessID>
      <Required>false</Required>
      <AutoSetList>
         <ParamName>PaperSize</ParamName>
         <ParamName>FinishingSize</ParamName>
      </AutoSetList>
   </FinishingProcess>
   <FinishingProcess>
      <ProcessNo>2</ProcessNo>
      <ProcessID>Stitching</ProcessID>
      <Required>true</Required>        12004
      <ReferenceProcess>
         <ProcessNo>3</ProcessNo>
      </ReferenceProcess>
      <AutoSetList>
         <ParamName>PaperSize</ParamName>
         <ParamName>FinishingSize</ParamName>
      </AutoSetList>
   </FinishingProcess>
   <FinishingProcess>
      <ProcessNo>3</ProcessNo>
      <ProcessID>Cutting</ProcessID>
      <Required>false</Required>
   </FinishingProcess>

<PartName>Cover</PartName>
   <FinishingProcess>
      <ProcessNo>1</ProcessNo>
      <ProcessID>Cutting</ProcessID>
      <Required>false</Required>
   </FinishingProcess>
</WorkflowRule>
```

FIG. 12D

PerfectBinding02.xml

```xml
<?xml version="1.0"?>
<WorkflowRule>
   <PartName>Body</PartName>          12005
   <FinishingProcess>
      <ProcessNo>1</ProcessNo>
      <ProcessID>Cutting</ProcessID>
      <Required>false</Required>
      <AutoSetList>
         <ParamName>PaperSize</ParamName>
         <ParamName>FinishingSize</ParamName>
      </AutoSetList>
   </FinishingProcess>
   <FinishingProcess>
      <ProcessNo>2</ProcessNo>
      <ProcessID>Folding</ProcessID>
      <Required>false</Required>
      <AutoSetList>
         <ParamName>PaperSize</ParamName>
         <ParamName>FinishingSize</ParamName>
      </AutoSetList>
   </FinishingProcess>
   <FinishingProcess>
      <ProcessNo>3</ProcessNo>
      <ProcessID>Binding</ProcessID>
      <Required>true</Required>
      <ReferenceProcess>
         <ProcessNo>4</ProcessNo>
      </ReferenceProcess>
      <AutoSetList>
         <ParamName>PaperSize</ParamName>
         <ParamName>FinishingSize</ParamName>
      </AutoSetList>
   </FinishingProcess>
   <FinishingProcess>                 12006
      <ProcessNo>4</ProcessNo>
      <ProcessID>Cutting</ProcessID>
      <Required>true</Required>
   </FinishingProcess>

<PartName>Cover</PartName>
   <FinishingProcess>
      <ProcessNo>1</ProcessNo>
      <ProcessID>Cutting</ProcessID>
      <Required>false</Required>
   </FinishingProcess>

<PartName>Jacket</PartName>
   <FinishingProcess>
      <ProcessNo>1</ProcessNo>
      <ProcessID>Cutting</ProcessID>
      <Required>false</Required>
      <AutoSetList>
         <ParamName>PaperSize</ParamName>
         <ParamName>FinishingSize</ParamName>
      </AutoSetList>
   </FinishingProcess>
   <FinishingProcess>
      <ProcessNo>2</ProcessNo>
      <ProcessID>Crease</ProcessID>
      <Required>false</Required>
   </FinishingProcess>

...

</WorkflowRule>
```

ADD PROCESS

PROCESS CAN BE INSERTED TO PLURALITY OF POSITIONS.
DESIGNATE INSERTION POSITION.

| 1 | CUTTING |
|---|---|
| 2 | PERFECT BINDING |

DOWN   OK   Cancel

FIG. 16A

| WF ID | WF NAME | WF FILE NAME | |
|---|---|---|---|
| ID1001 | PERFECT BINDING 001 | WF1001.xml | ─16001 |
| ID1002 | SADDLE STITCHING 001 | WF1002.xml | |
| ID1003 | PERFECT BINDING 002 | WF1003.xml | |

FIG. 16B

WF1001.xml

```xml
<?xml version="1.0"?>
<Workflow>
    <Name>PERFECT BINDING 001</Name>
    <Type>PerfectBinding</Type>
    <Part>
        <PartName>Body</PartName>
        <Process>
            <ProcessNo>1</ProcessNo>           ~16001
            <ProcessID>Cutting</ProcessID>
            <Param>
                <PaperSizeWidth>100</PaperSizeWidth>
                <PaperSizeHeight>297</PaperSizeWidth>
                ...
            </Param>
        </Process>
        <Process>
            <ProcessNo>2</ProcessNo>
            <ProcessID>Binding</ProcessID>
            <Param>
                <BodyPaperSizeWidth>100</PaperSizeWidth>
                <BodySizeHeight>297</PaperSizeWidth>
                ...
            </Param>
        </Process>
        <Process>
            <ProcessNo>3</ProcessNo>           ~16002
            <ProcessID>Cutting</ProcessID>
            <Param>
                <PaperSizeWidth>100</PaperSizeWidth>
                <PaperSizeHeight>297</PaperSizeWidth>
                ...
            </Param>
        </Process>
    <Part>
    <Part>
        <PartName>Cover</PartName>
        <Process>
            <ProcessNo>1</ProcessNo>
            <ProcessID>Cutting</ProcessID>
            <Param>
                <PaperSizeWidth>210</PaperSizeWidth>
                <PaperSizeHeight>297</PaperSizeWidth>
                ...
            </Param>
        </Process>
    <Part>
    ...

</Workflow>
```

FIG. 17A

| ID | RULE FILE NAME |
|---|---|
| ID1 | Rule01.xml |
| ID2 | Rule02.xml |
| ID3 | Rule03.xml |

Rule01.xml

```xml
<?xml version="1.0"?>
<ProcessRule>
    <Process>                                          17001
        <ProcessNo>1</ProcessNo>
        <ProcessID>flolding</ProcessID>                17002
        <DeviceID>FoldingFinisher</DeviceID>           17003
    </Process>
    <Process>
        <ProcessNo>2</ProcessNo>
        <ProcessID>Binding</ProcessID>
        <DeviceID>BindingFinisher</DeviceID>
    </Process>
    <Process>
        <ProcessNo>3</ProcessNo>
        <ProcessID>Cutting</ProcessID>
        <DeviceID>CuttingFinisher</DeviceID>
    </Process>
...

</ProcessRule>
```

```
<JMF xmlns="http://www.CIP4.org/JDFSchema_1_1" MaxVersion="1.5" SenderID="Sender" TimeStamp="2018-08-1T8:23:12+02:00" Version="1.5" xmlns:xsi="http://www.w3.org/2001/XMLSchema-instance">
  <Query ID="0001" Type="KnownDevices" >
    <DeviceFilter DeviceDetails="Process"/>
    <Process>
      <ProcessID>Folding</ProcessID>
      <ProcessID>Binding</ProcessID>
      <ProcessID>Cutting</ProcessID>
    </Process>
  </Query>
</JMF>
```

```
<JMF xmlns="http://www.CIP4.org/JDFSchema_1_1" MaxVersion="1.5" SenderID="Finisher" TimeStamp="2018-08-1T8:23:15+02:00" Version="1.5" xmlns:xsi="http://www.w3.org/2001/XMLSchema-instance">
  <Response ID="0001" ReturnCoce="0" Type="KnownDevices">
    <ProcessInfo>
      <Process>
        <ProcessNo>1</ProcessNo>
        <ProcessID>folding</ProcessID>
        <DeviceID>FoldingFinisher</DeviceID>
      </Process>
      <Process>
        <ProcessNo>2</ProcessNo>
        <ProcessID>Binding</ProcessID>
        <DeviceID>BindingFinisher</DeviceID>
      </Process>
      <Process>
        <ProcessNo>3</ProcessNo>
        <ProcessID>Cutting</ProcessID>
        <DeviceID>CuttingFinisher</DeviceID>
      </Process>
    </ProcessInfo>
  </Responce>
</JMF>
```

INFORMATION PROCESSING DEVICE FOR GENERATING OF A WORKFLOW AND METHOD FOR CONTROLLING THE SAME

BACKGROUND OF THE INVENTION

Field of the Invention

The present invention relates to setting of a workflow for producing a product in commercial printing.

Description of the Related Art

In printing workflow software disclosed in Japanese Patent Laid-Open No. 2014-164765, a user can set a workflow by freely coupling icons representing processes on a graphical user interface (GUI).

In the commercial printing industry, a work process regarding production of a product includes pre-press (imposition of content data or attachment of a register mark or a barcode), press (printing in an image forming device), and post-press (finishing in a finishing device). In addition, the format of the product is various, and the type of product (merchandise) includes a cut sheet (business card or flier), a book (saddle stitched book or perfect bound book), and the like. Parts that form the product include a body, a cover, a title page, a jacket, an obi, and the like. In addition, the product is produced not only by setting parameters for printing but also by setting parameters for pre-press and post-press (e.g., setting for pre-processing before printing such as barcode, folding, or cutting and setting for finishing after printing).

In a case where a workflow is generated to produce merchandise in commercial printing, it is necessary to not only add a necessary process but also set parameters in each process for each part. In particular, in commercial printing, the number of processes and the number of items to be set in each process are large in many cases. Thus, it is complicated to generate the workflow, and it is difficult for a user to easily set the workflow. Although Japanese Patent Laid-Open No. 2014-164765 discloses a technique for adding a process on a graphical user interface but does not consider setting of the parameters for each process. Japanese Patent Laid-Open No. 2014-164765 further discloses that, if a user drags and drops a process icon at a position that does not satisfy a condition, a highlight is displayed. However, the user has had to repeatedly drag and drop the process icon until the position satisfies the condition. In addition, the user has had to care about the order of processes to create a workflow. In particular, since the workflow for producing merchandise in commercial printing involves a large number of processes and a large number of items to be set in each process in many cases, it tends to be complicated to generate the workflow.

SUMMARY OF THE INVENTION

The present invention provides a user interface that can generate a workflow without a user caring about the order of processes.

An information processing device according to an example of the present invention is an information processing device that generates a workflow by combining a plurality of work processes for producing a product. The information processing device includes: a storing unit configured to store information that identifies an order of the plurality of work processes used to produce a product; a setting unit configured to set a parameter for a work process and issue an instruction to add the work process to the plurality of work processes based on user input on a work-process setting screen; and a first generating unit configured to, in accordance with the information for identifying an order of the plurality of work processes, add the work process to the plurality of work processes according to the instruction and configured to generate a workflow including information regarding the order of the work process and the set parameter for the work process.

Further features of the present invention will become apparent from the following description of exemplary examples with reference to the attached drawings.

BRIEF DESCRIPTION OF THE DRAWINGS

FIGS. 6A to 6D illustrate examples of workflow rules generated by the information processing device according to the first example.

FIG. 8B illustrates an example of a user interface screen according to the first example.

FIG. 8G illustrates an example of a user interface screen according to the first example.

FIGS. 10A and 10B illustrate an example of a workflow list generated by the information processing device according to the first example.

FIGS. 12A to 12D illustrate examples of workflow rules generated by the information processing device according to the second example.

FIG. 14B illustrates an example of a user interface screen according to the second example.

FIGS. 16A and 16B illustrate an example of a workflow list generated by the information processing device according to the second example.

FIGS. 17A and 17B illustrate an example of a workflow rule generated by the finishing management device according to the second example.

FIGS. 18A and 18B illustrate examples of commands that are generated by the information processing device and the finishing management device according to the second example to be transmitted and received.

DESCRIPTION OF THE EXAMPLES

Hereinafter, a first example for implementing the present invention will be described with reference to some drawings.

Configuration Example of Information Processing System

Figure 1:
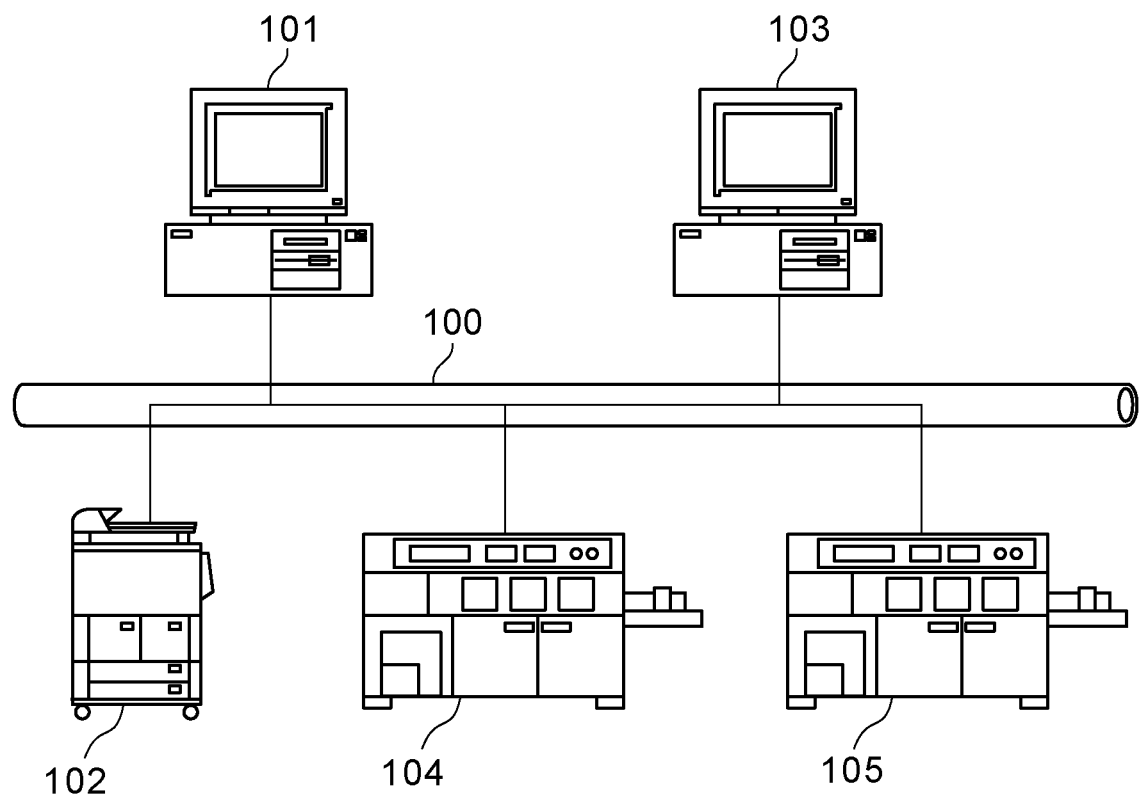
FIG. 1 illustrates a system configuration of an information processing system according to a first example.

FIG. 1 illustrates the entire configuration of an information processing system according to the first example of the present invention. Note that the following environment of the entire information processing system is illustrated for easy understanding of the present invention and is not limiting the environment of the present invention.

In FIG. 1, a network 100 is connected to an information processing device 101, an image forming device 102, a finishing management device 103, and finishing devices 104 and 105.

Each of the information processing device 101 and the finishing management device 103 is a network computer (hereinafter simply referred to computer) that can mutually communicate with another device via the network 100 and is typically a personal computer (PC). Each computer can execute an application program of a workflow management application, a job management application, a finishing application, or the like. In addition, the information processing device 101 and the finishing management device 103 can be connected to the image forming device 102 and the finishing management device 103 via the network 100 so as to transmit and receive a command for controlling the image forming device 102 and the finishing devices 104 and 105. The information processing device 101 creates and manages the combination, order, and setting of processes for producing a product in the workflow management application. Also, the information processing device 101 controls transmission of a job for producing a product to each device in the job management application. As a result, the information processing device 101 can manage the entire flow regarding the production of the product. In the finishing management device 103, the finishing application manages the finishing devices 104 and 105. That is, the finishing management device 103 collectively manages a plurality of finishing devices and transmits a control command for finishing in each of the finishing devices, for example.

The image forming device 102 analyzes print data including printed character data transmitted from the information processing device 101 or the like and converts the data to a dot image for each page for printing. In addition, the image forming device 102 communicates with the finishing management device 103 via the network 100 to transmit and receive control information, for example. The image forming device 102 outputs a printed material, and a print operator carries the printed material by hand to the finishing devices 104 and 105, or a belt conveyer (not illustrated) transfers the printed material to the finishing devices 104 and 105. More specifically, a printed material from the image forming device 102 is directly placed on a belt conveyer that is connected to a discharge portion of the image forming device 102 to be directly transported to the finishing devices 104 and 105. Alternatively, the printed material is temporarily placed in a temporal space, and then an operator places the printed material on a belt conveyer or carries the printed material by hand so that the printed material is transported to the finishing devices 104 and 105.

The finishing devices 104 and 105 each perform finishing such as cutting, creasing, binding, or folding on the printed material that is output from the image forming device 102. The finishing devices 104 and 105 process the printed material from the image forming device individually or combine jobs of a plurality of image forming devices to process them as a single product. A cutting device, for example, processes the printed material from the image forming device individually. A perfect binding device (that forms a perfect bound book from a printed material from one image forming device as a cover and a printed material from another image forming device as a body), for example, combines jobs of a plurality of image forming devices to process them as a single product.

Although FIG. 1 illustrates the single information processing device 101 and the single image forming device 102, there may be a plurality of information processing devices 101 and a plurality of image forming devices 102. There may be three or more finishing devices 104 and 105. In addition, the network 100 may be the internet, and for example, the information processing device 101 may access the image forming device 102 and the finishing management device 103 on the internet. Note that the image forming device 102 is a printing device, and the finishing devices 104 and 105 are each a printed-material processing device.

Hardware Configuration Example of Information Processing System

Figure 2:
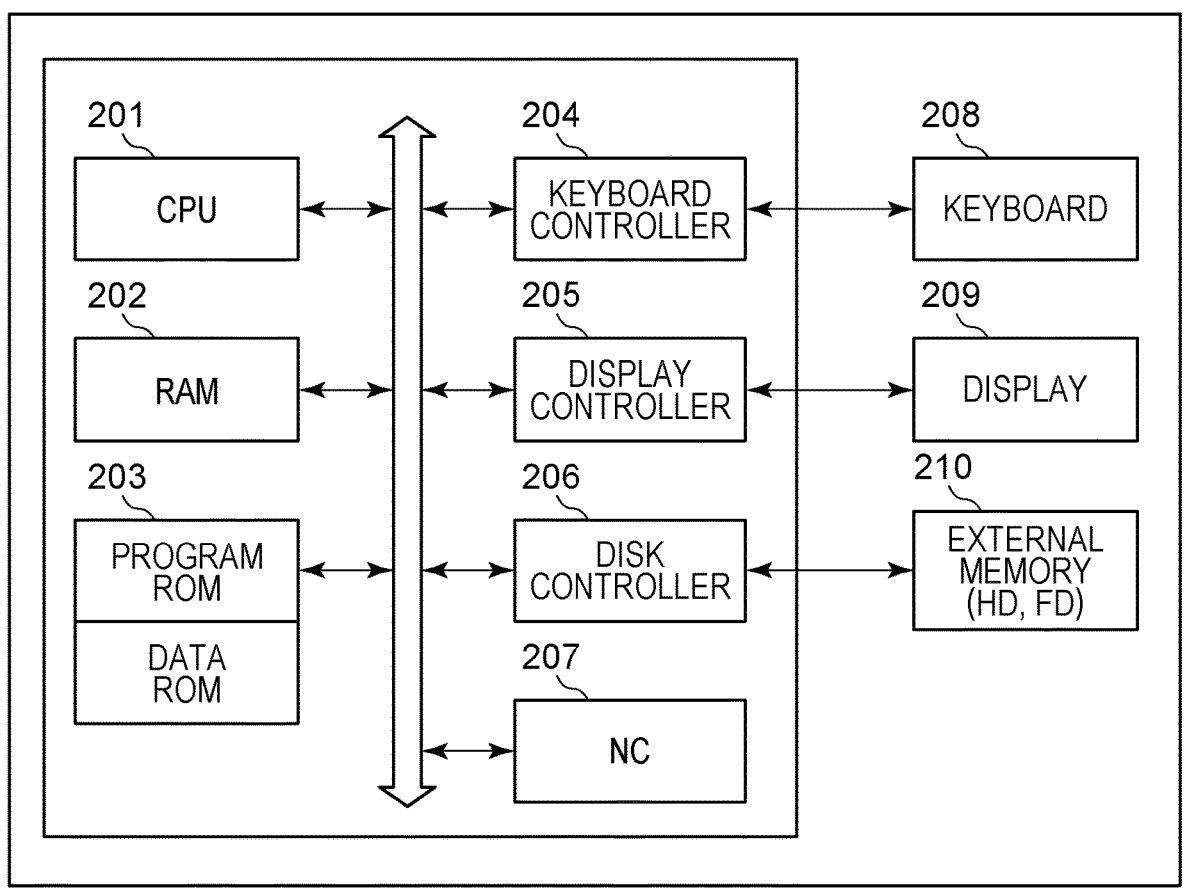
FIG. 2 is a block diagram illustrating a hardware configuration of an information processing device and a finishing management device according to the first example.

FIG. 2 illustrates a hardware configuration of the information processing device 101 and the finishing management device 103 according to this example. The information processing device 101 and the finishing management device 103 can be configured by using hardware components of a typical computer (PC). In FIG. 2, a central processing unit (CPU) 201 executes a program stored in a program read-only memory (ROM) in a ROM 203 or a program of, for example, an operating system (OS) or an application that is loaded from a hard disk 210 as an external memory to a random access memory (RAM) 202.

That is, the CPU 201 executes the program stored in a readable storage medium so as to serve as the processing units that perform processing in the flowcharts described later. The RAM 202 is a main memory of the CPU 201 and serves as a work area or the like. A keyboard controller 204 controls an operation input from a keyboard 208 or a pointing device (not illustrated) such as a mouse, a touch pad, a touch panel, or a trackball. A display controller 205 controls display of a display 209. A disk controller 206 controls data access to an external memory 210 such as a hard disk (HD) or a flexible disk (FD) that stores various types of data. A network controller (NC) 207 is connected to the network and controls communication with another device that is connected to the network.

Figure 3:
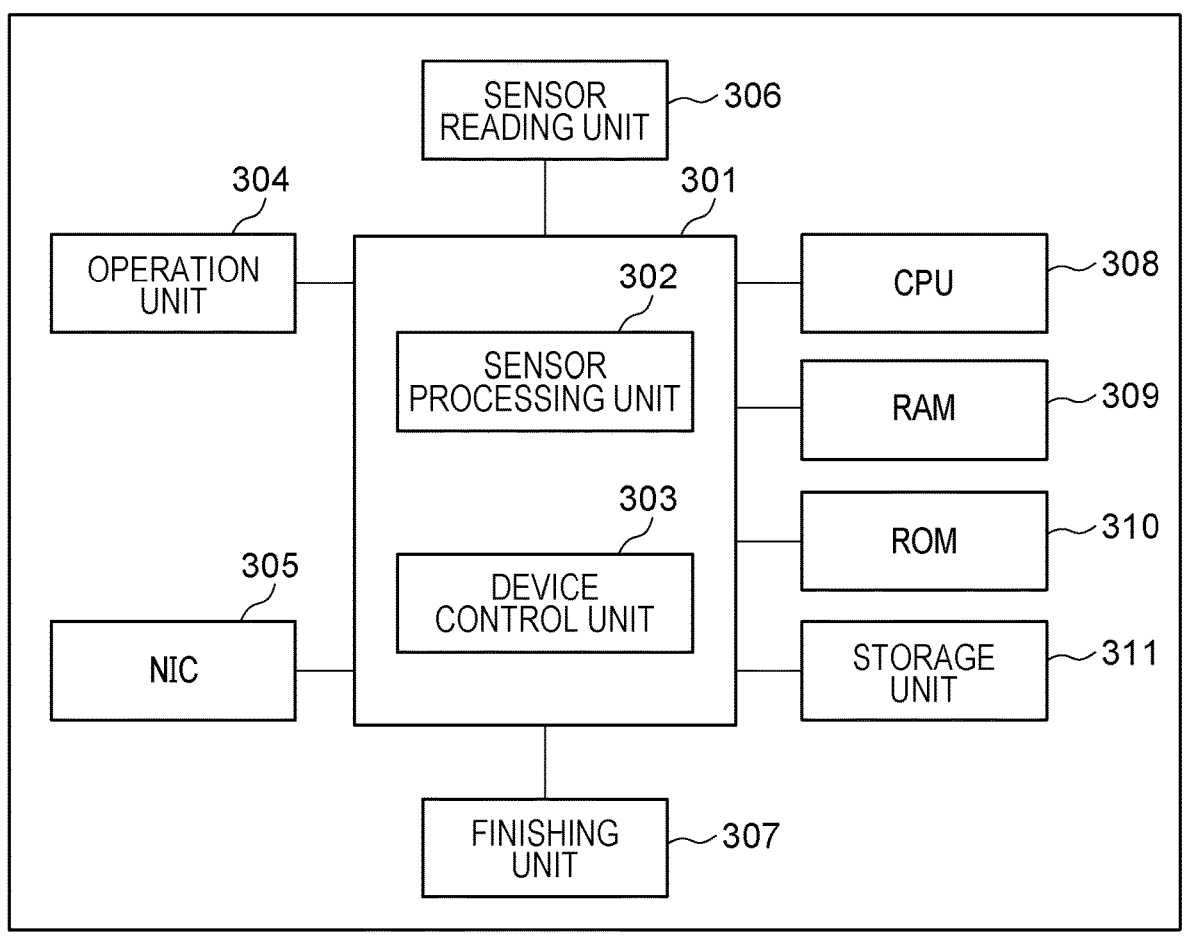
FIG. 3 is a block diagram illustrating a hardware configuration of a finishing device according to the first example.

FIG. 3 illustrates a hardware configuration of each of the finishing devices 104 and 105 according to this example. Each of the finishing devices 104 and 105 includes an operation unit 304, a network interface controller (NIC) 305, a CPU 308, a RAM 309, a ROM 310, a storage unit 311, a sensor reading unit 306, and a finishing unit 307, which are connected via a control unit 301. The control unit 301 includes a sensor processing unit 302 and a device control unit 303. The sensor processing unit 302 processes sensor information that is read by the sensor reading unit 306, and the device control unit 303 controls the entirety of the finishing device 104. The operation unit 304 is configured from, for example, a software keyboard, a touch panel, and other input/output device and can receive and display various set values. The CPU 308 executes a program stored in the ROM 310 or an application program that is loaded from the storage unit 311 to the RAM 309, for example. That is, the CPU 308 executes the program stored in a readable storage medium so as to serve as the processing units that perform processing in the flowcharts described later. The RAM 309 is a main memory of the CPU 308 and serves as a work area or the like. The sensor reading unit 306 can read, for example, job information of a printed material that is a finishing target by using a device such as a camera (e.g., collate the combination of the cover and body of a perfect binding job or determine whether the product is correctly produced without page missing). The control unit 301 provides finishing information stored in the storage unit 311 to the operation unit 304 and outputs finishing setting information to the operation unit 304. In addition, similarly, the control unit 301 provides finishing information stored in the storage unit 311 to the finishing unit 307, and the finishing unit 307 performs processing in various manners. In addition, the finishing devices 104 and 105 are connected to the network through the NIC 305 so as to transmit and receive data. Data obtained through the NIC 305 can also be displayed on the operation unit 304.

Figure 4:
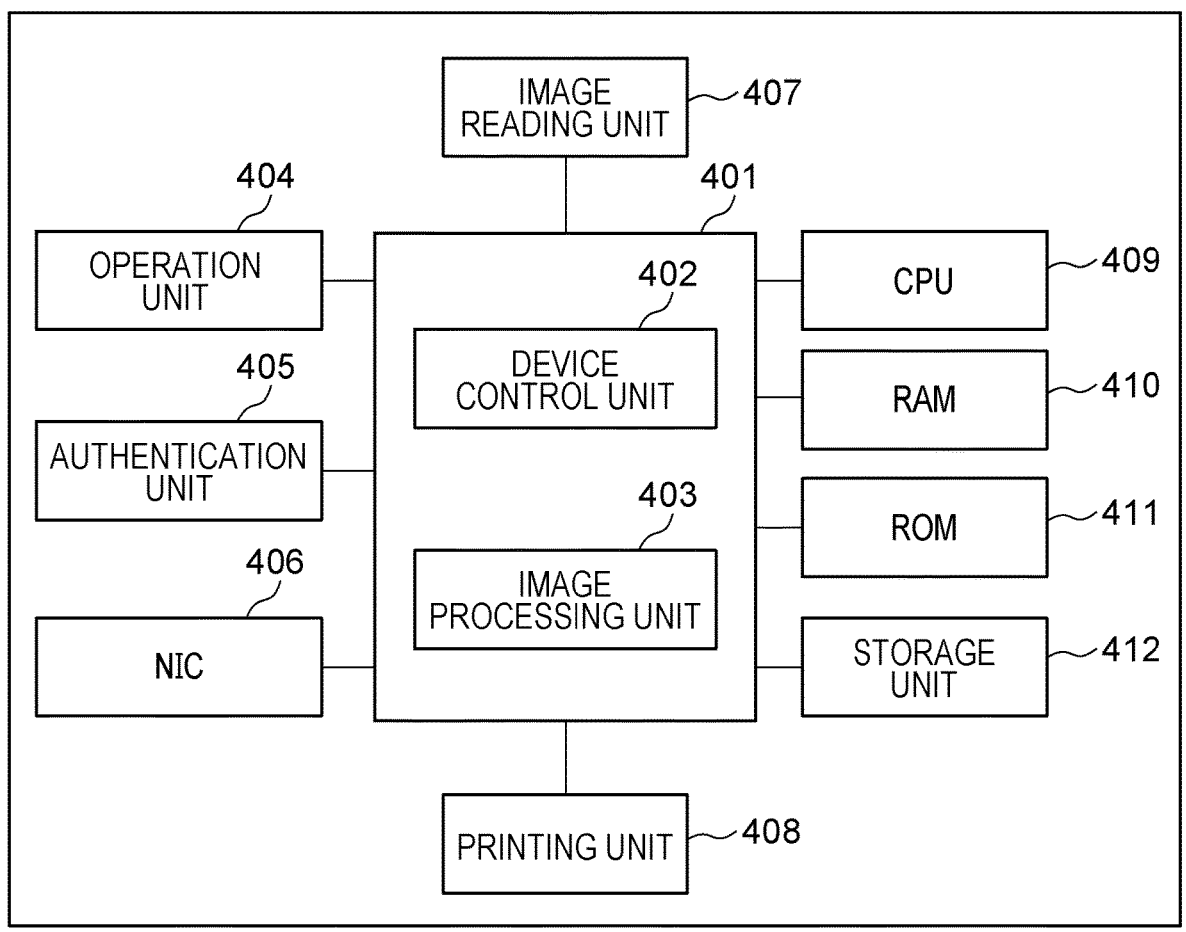
FIG. 4 is a block diagram illustrating a hardware configuration of an image forming device according to the first example.

FIG. 4 illustrates a hardware configuration of the image forming device 102 according to this example. The image forming device 102 includes an operation unit 404, an authentication unit 405, an NIC 406, a CPU 409, a RAM 410, a ROM 411, a storage unit 412, an image reading unit 407, and a printing unit 408, which are connected via a control unit 401. The control unit 401 includes a device control unit 402 and an image processing unit 403. The device control unit 402 controls the entirety of the image forming device 102, and the image processing unit 403 processes image data. The operation unit 404 is configured from, for example, a software keyboard, a touch panel, and other input/output device and can receive and display various set values. The CPU 409 executes a program stored in the ROM 411 or an application program that is loaded from the storage unit 412 to the RAM 410, for example. That is, the CPU 409 executes the program stored in a readable storage medium so as to serve as the processing units that perform processing in the flowcharts described later. The RAM 410 is a main memory of the CPU 409 and serves as a work area or the like. The image reading unit 407 is configured from a scanner, for example, and can read a paper document or the like to acquire a document image in an image data format. The control unit 401 provides a document image stored in the storage unit 412 to the operation unit 404 and outputs the document image to the operation unit 404. In addition, similarly, the control unit 401 provides a document image stored in the storage unit 412 to the printing unit 408, and the printing unit 408 outputs the document image in various formats. For example, the printing unit 408 can output image data regarding the document image to a storage medium. Alternatively, the printing unit 408 may include a printing function and may output a document image onto an output medium such as paper. In addition, the image forming device 102 is connected to the network through the NIC 406 so as to transmit and receive data. Data obtained through the NIC 406 can also be displayed on the operation unit 404.

Software Configuration Example of Information Processing System

Figure 5:
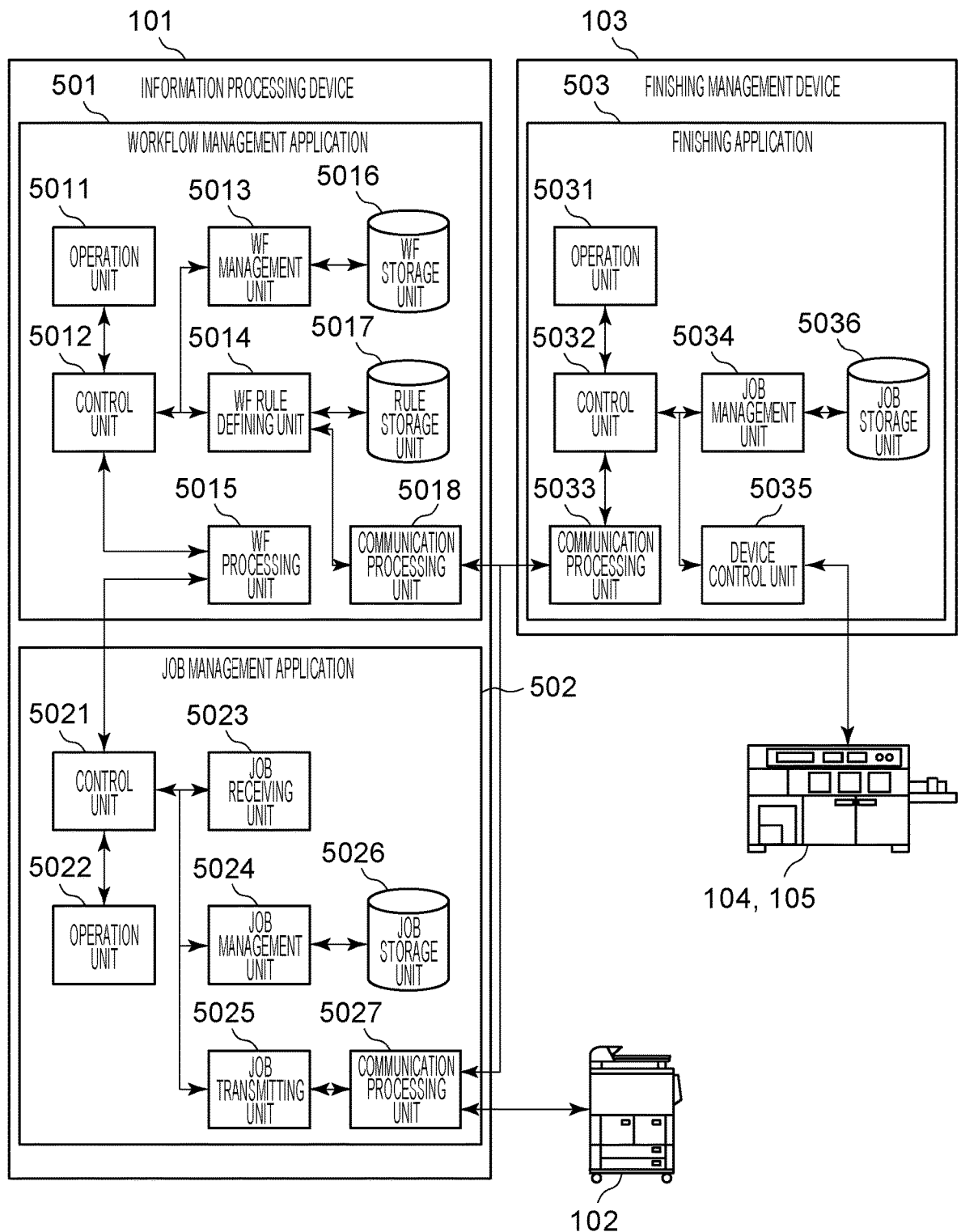
FIG. 5 is a block diagram illustrating a software configuration of the information processing device and the finishing management device according to the first example.

FIG. 5 is a functional block diagram illustrating the functions according to this example.

First, functions of processing units of the information processing device 101 will be described. The information processing device 101 includes a workflow management application 501 and a job management application 502. The workflow management application 501 generates and manages processes (e.g., imposition, printing, folding, creasing, cutting, and binding) for producing a product. The job management application 502 manages jobs that flow to the devices for producing the product on the basis of a workflow (WF).

In the workflow management application 501, an operation unit 5011 is an operation unit that displays a user interface for managing the workflow, as illustrated in FIGS. 8A to 8H and FIG. 9, which will be described later. A control unit 5012 is a control unit that controls operations of the processing units of the workflow management application 501. For example, the control unit 5012 controls a WF management unit 5013 and a WF rule defining unit 5014 in accordance with setting that is input to the operation unit 5011. The WF management unit 5013 is a workflow management unit for managing a workflow list illustrated in FIGS. 10A and 10B, which will be described later, created by a user on the operation unit 5011. The WF rule defining unit 5014 is a workflow rule defining unit that defines a rule of finishing illustrated in FIGS. 6A to 6D for creating a workflow. A WF processing unit 5015 is a workflow processing unit for performing processing in accordance with a workflow for a job for producing a product, the job being received by the information processing device 101. The WF processing unit 5015 communicates with the job management application 502 so as to manage the progress of the workflow or issue an instruction regarding a process to be executed next, for example. The WF processing unit 5015 manages the job (job ID) managed in the job management application 502 and a workflow (WF ID) managed by a WF storage unit 5016 in association with each other. Note that "WF ID" is a workflow ID. In addition, the WF processing unit 5015 may further manage a processing start time of the workflow for the job, for example. The WF storage unit 5016 is a workflow storage unit for storing the workflow list illustrated in FIGS. 10A and 10B on the basis of information received from the WF management unit 5013. A rule storage unit 5017 is a rule storage unit for storing the workflow rules illustrated in FIGS. 6A to 6D on the basis of information received from the WF rule defining unit 5014. A communication processing unit 5018 is a communication processing unit that transmits and receives information such as a command to/from the finishing management device 103 via the network 100.

In the job management application 502, a control unit 5021 is a control unit that controls operations of the processing units of the job management application 502. For example, the control unit 5021 transfers information regarding a job for producing a product to the WF processing unit 5015 of the workflow management application 501. Then, on the basis of an instruction from the WF processing unit 5015, the control unit 5021 instructs processing units to transmit the job to the image forming device 102 or the finishing management device 103. An operation unit 5022 is an operation unit that displays a job list on a user interface (not illustrated) in the information processing device 101 and that includes a control or the like for operating (e.g., editing or deleting) the jobs. A job receiving unit 5023 is a job receiving unit for receiving an input of the job for producing a product. The input of the job may be received from another device (input system) or may be received by monitoring a folder on the information processing device 101 and detecting job data that is input (copied) to the folder. Information of the input job is transmitted to the WF processing unit 5015 of the workflow management application 501 through the control unit 5021. A job management unit 5024 is a job management unit that stores the job received by the job receiving unit 5023 in a job storing unit 5026 for management. A job transmitting unit 5025 is a job transmitting unit for transmitting job data (not illustrated) to be processed in the image forming device 102 or the finishing devices 104 and 105. The job is transmitted upon reception of an instruction to the job transmitting unit 5025 through the control unit 5021 in response to an instruction from the WF processing unit 5015 of the workflow management application 501. Accordingly, on the basis of the workflow, the input job is automatically processed in the information processing device 101, the image forming device 102, and the finishing devices 104 and 105. The job storing unit 5026 is a job storing unit for storing information (including a job ID, job data, and the like) and the job data (not illustrated). The information is about the job received by the job receiving unit 5023. A communication processing unit 5027 is a communication processing unit that transmits and receives information such as the job data and a command to/from the image forming device 102 and the finishing management device 103 via the network 100.

Next, a finishing application 503 in the finishing management device 103 will be described. The finishing application 503 generally manages and controls a plurality of finishing devices in accordance with a job, a command, or the like received from the information processing device 101. In addition, the finishing application 503 manages a workflow for processing a product in a plurality of finishing devices.

In the finishing application 503, an operation unit 5031 displays the job list from the information processing device 101 on a user interface (not illustrated). In addition, the operation unit 5031 includes a control or the like for operating the jobs (e.g., giving an instruction to the finishing devices 104 and 105, or editing or deleting a job). A control unit 5032 is a control unit that controls operations of the processing units of the finishing application 503. For example, the control unit 5032 issues an instruction for finishing in the finishing devices 104 and 105 through a device control unit 5035 in accordance with an execution instruction that is input to the operation unit 5031. A communication processing unit 5033 is a communication processing unit that transmits and receives information such as the job data and a command to/from the information processing device 101 and the image forming device 102 via the network 100. A job management unit 5034 is a job management unit that stores the job received from the information processing device 101 in a job storing unit 5036 for management. The device control unit 5035 is a device control unit for controlling the finishing in the finishing devices 104 and 105 (transferring parameter information or issuing an instruction for starting the processing). The job storing unit 5036 is a job storing unit for storing job information and job data (not illustrated) that are received from the information processing device 101.

Examples of WF Rules Generated by Information Processing System

FIGS. 6A to 6D illustrate examples of WF rules in finishing. The WF rules are created by the WF rule defining unit 5014 of the information processing device 101 in the information processing system according to this example and stored in the rule storage unit 5017. The WF rule is used as a rule when the WF management unit 5013 generates a workflow.

The WF rule is formed of a rule list (FIG. 6A) and rule files (FIGS. 6B, 6C, and 6D). In the rule list, a rule list is defined for each product, and in the rule files, details of rules of the products that are linked from the rule list are defined.

In FIG. 6A, the rule list of products is formed of "product ID" that is uniquely assigned in accordance with the type of each product, "product name" indicating the name of the type of each product, and "rule file name" indicating the name of a rule file in which the WF rule of each product is described. In the rule files (FIGS. 6B, 6C, and 6D) linked from the "rule file name", details of rules of finishing in accordance with products are defined. For example, FIGS. 6B, 6C, and 6D respectively define rules of finishing for producing a product such as a cut sheet (business card or flier), a saddle stitched book, and a perfect bound book. Note that the cut sheet herein means a product that is not bound. In FIG. 6B, reference numeral 6001 indicates a part name (e.g., body, cover, jacket, or obi) that is a component of a product. Reference numeral 6002 indicates a value that corresponds to a process order. When the WF management unit 5013 generates a workflow, the processes are arranged in the order corresponding to 6002, and the workflow is generated. Reference numeral 6003 indicates a process ID indicating the type of a process. The type of the process ID includes cutting (cutting process), stitching (saddle stitching process), folding (folding process), binding (perfect binding process), creasing (creasing process), and the like.

Although FIGS. 6A to 6D illustrate a case where the WF rule of the finishing is defined, a rule in other processing (imposition or printing) may also be defined. In addition, although an example of XML data is illustrated, data of another format may be used, or a table in which the process order is identified may be used. Furthermore, although examples of a cut sheet, a saddle stitched book, and a perfect bound book are illustrated, these are merely examples, and another product may be produced.

Processing Flowchart in Information Processing System

Figure 7A:
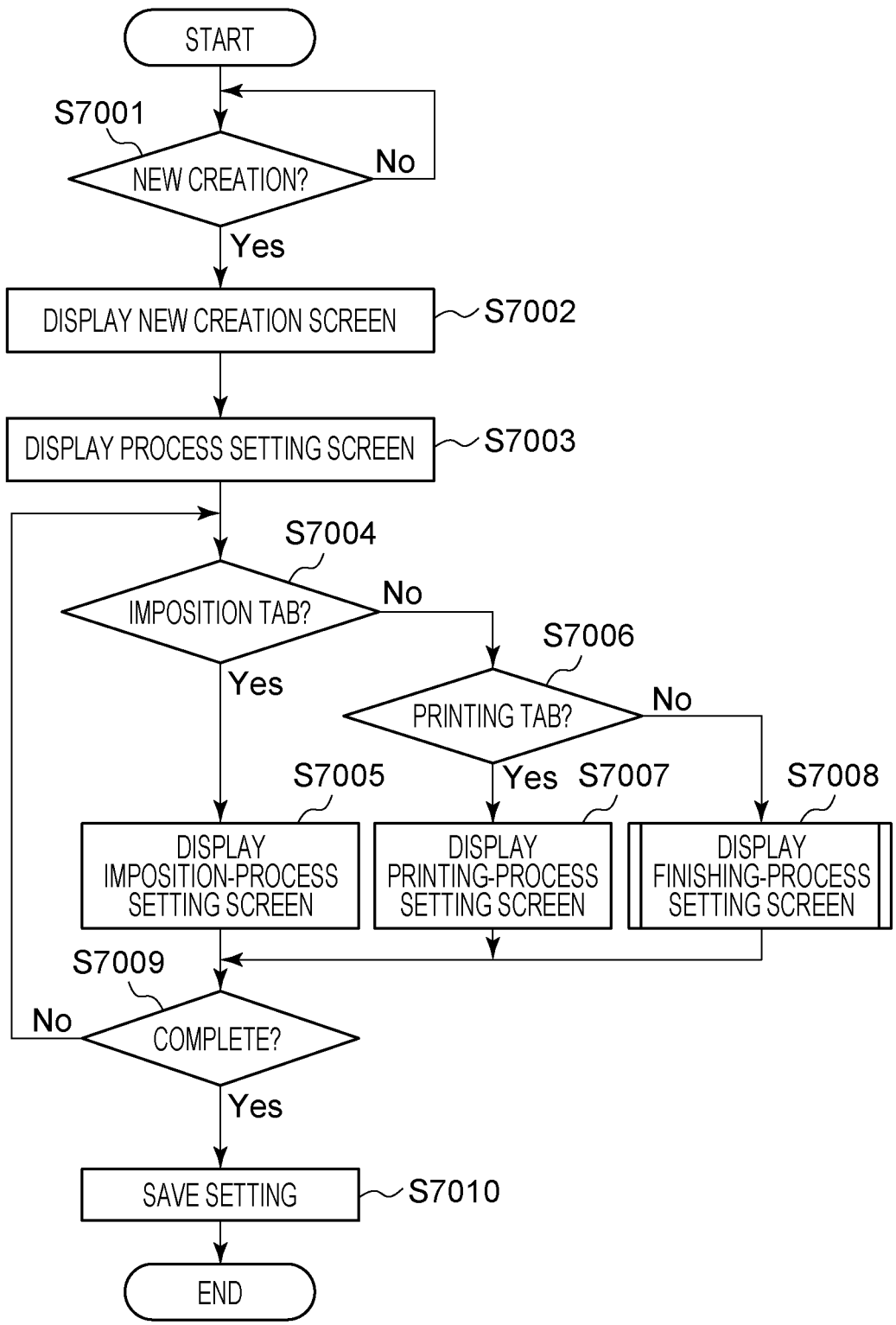
FIG. 7A is a processing flowchart of the information processing system according to the first example.
Figure 7B:
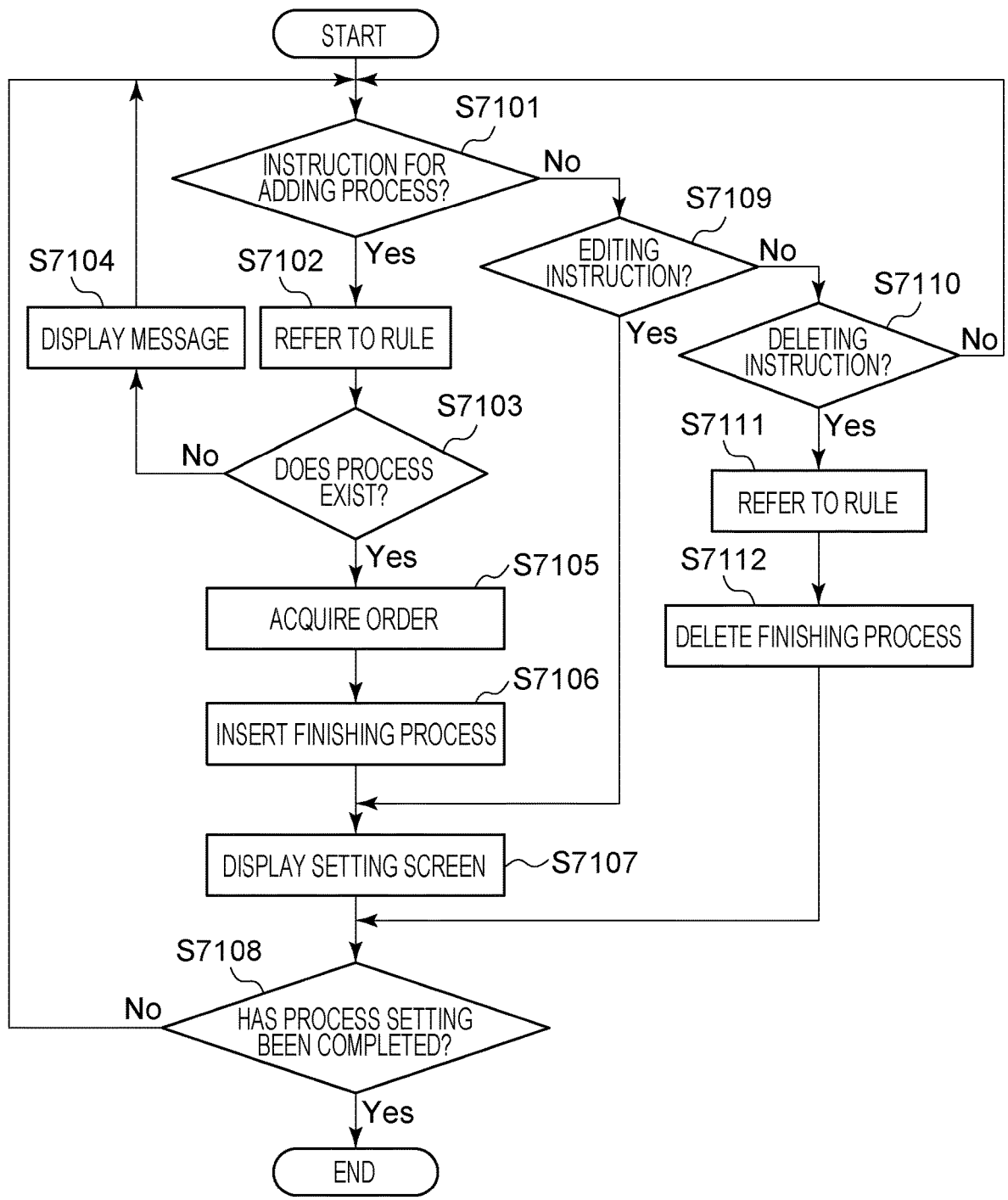
FIG. 7B is a processing flowchart of the information processing system according to the first example.
Figure 7C:
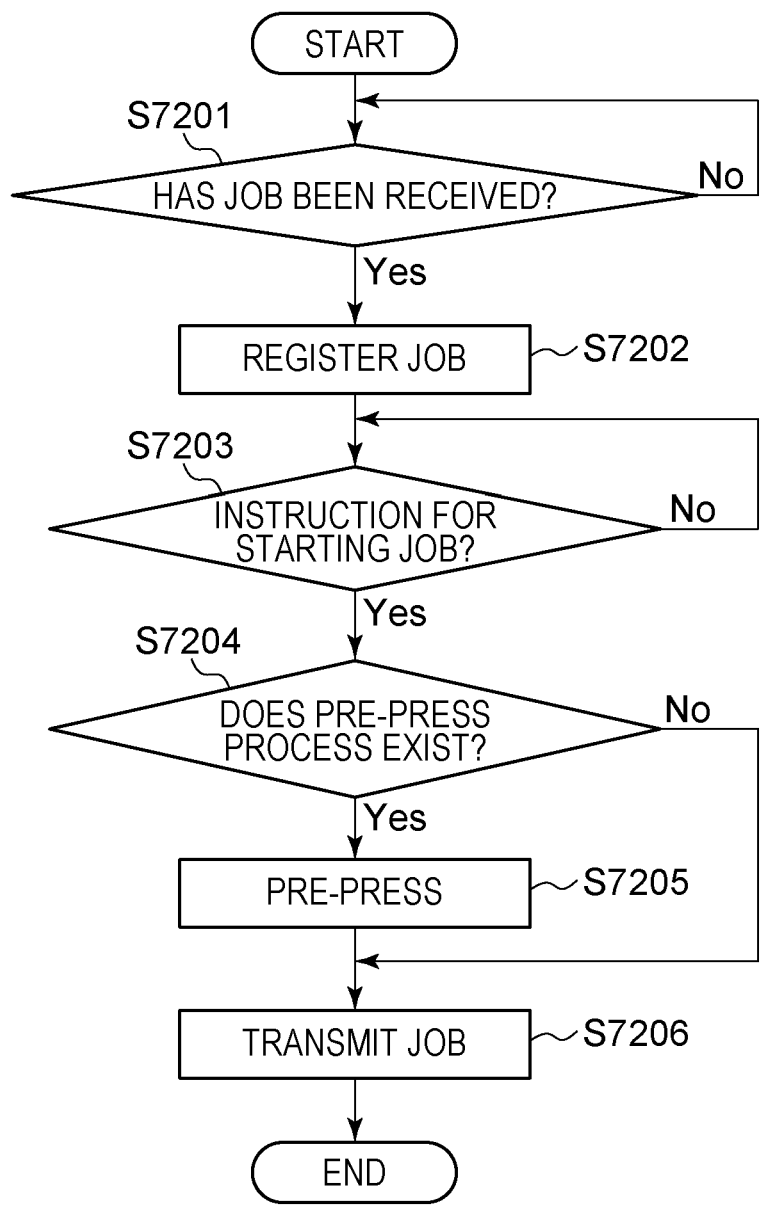
FIG. 7C is a processing flowchart of the information processing system according to the first example.

FIGS. 7A to 7C each illustrate a process flow for creating and executing a workflow in the information processing device 101 in the information processing system according to this example. Programs for the flows are stored in the ROM 203 of the information processing device 101 and are loaded to the RAM 202 and executed by the CPU 201.

FIG. 7A is a flowchart illustrating a process flow for creating a workflow in the workflow management application 501.

In FIG. 7A, in S7001, the operation unit 5011 of the workflow management application 501 determines whether a user has given an instruction for creating a workflow. Specifically, it is determined whether a button for new creation has been depressed on a user interface, an example of which is illustrated in FIG. 8H. If the instruction for creation has been given, the processing proceeds to S7002.

Figure 8A:
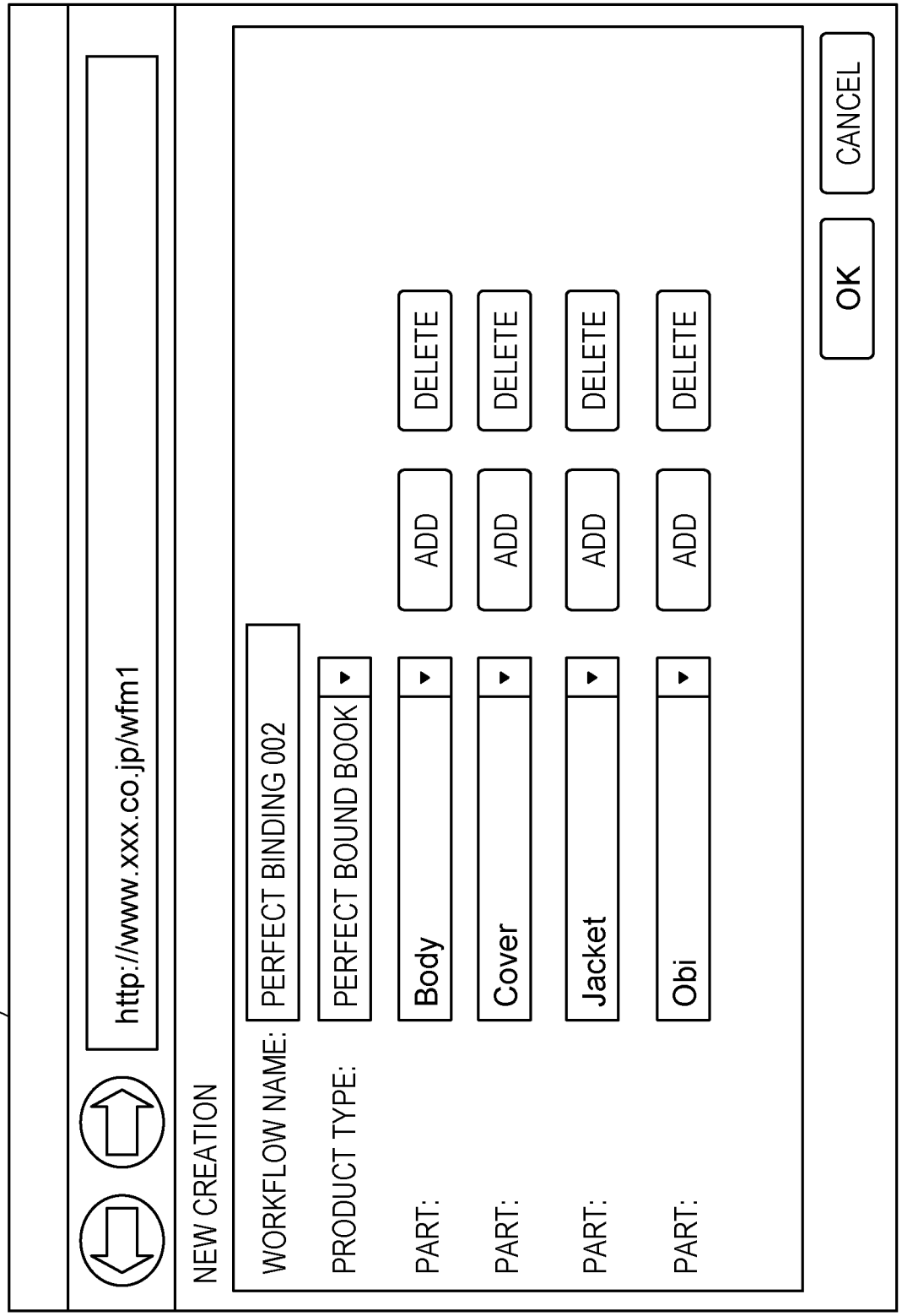
FIG. 8A illustrates an example of a user interface screen according to the first example.

In S7002, the operation unit 5011 displays a workflow new creation screen illustrated in FIG. 8A. If conditions of the workflow are designated in FIG. 8A and an "OK" button is depressed, the processing proceeds to S7003.

Figure 8C:
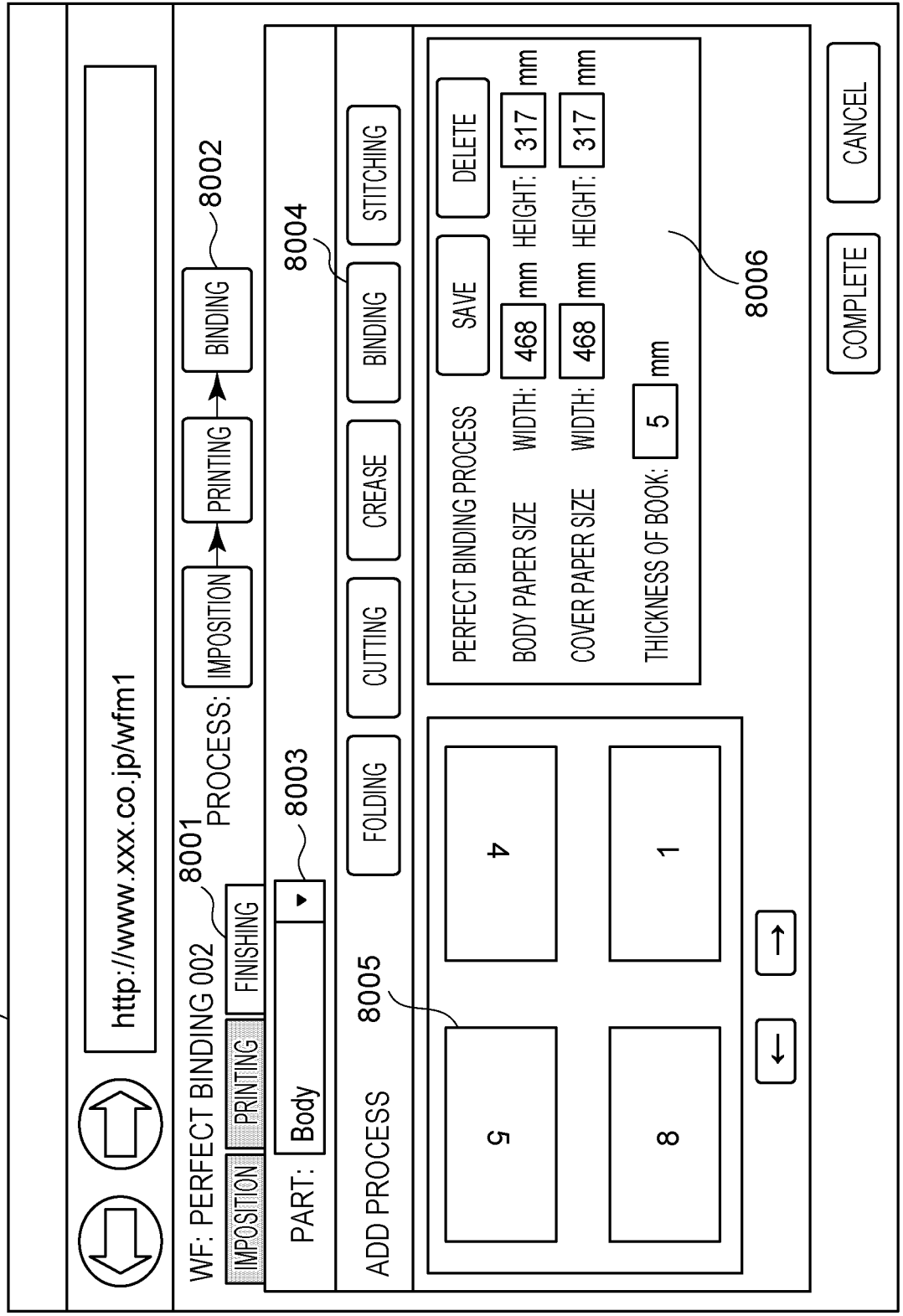
FIG. 8C illustrates an example of a user interface screen according to the first example.

In S7003, the operation unit 5011 displays a process setting screen illustrated in FIG. 8C.

In S7004, the operation unit 5011 determines whether an imposition tab has been selected in a process tab 8001 in FIG. 8C. If the imposition tab has been selected, the processing proceeds to S7005. If the selected tab is not the imposition tab, the processing proceeds to S7006. Note that when the process setting screen illustrated in FIG. 8C is displayed for the first time (when the "OK" button is depressed on the new creation screen), the imposition tab is selected as default.

In S7005, the operation unit 5011 displays a setting screen for setting an imposition process. On the imposition-process setting screen, a user can set a layout of content images or set parameters for inserting a register mark, a barcode, or the like on a type page, for example.

In S7006, the operation unit 5011 determines whether a printing tab has been selected in the process tab 8001 in FIG. 8C. If the printing tab has been selected, the processing proceeds to S7007. If the selected tab is not the printing tab (i.e., a finishing tab is selected), the processing proceeds to S7008.

In S7007, the operation unit 5011 displays a setting screen for setting a printing process. On the printing-process setting screen, the user can set parameters (such parameters include, for example, print sheet, printing method (simplex/duplex)) regarding printing in the image forming device 102.

In S7008, the operation unit 5011 displays a setting screen, an example of which is illustrated in FIG. 8C for setting a finishing process. Details of setting regarding the finishing process are illustrated in a flowchart in FIG. 7B.

In S7009, the operation unit 5011 determines whether the setting of the workflow has been completed. That is, it is determined whether a "COMPLETE" button has been depressed on the user interface illustrated in FIG. 8C. If the setting of the workflow has been completed, the processing proceeds to S7010; if the setting has not been completed (another tab has been selected), the processing proceeds to S7004.

In S7010, the control unit 5012 creates the workflow list illustrated in FIGS. 10A and 10B and stores it in the WF storage unit 5016 through the WF management unit 5013.

FIG. 7B is a flowchart illustrating a process flow for setting the finishing process in S7008 in FIG. 7A.

In FIG. 7B, in S7101, the operation unit 5011 determines whether the user has given an instruction for adding the finishing process in the workflow. Specifically, it is determined whether a button 8004 for adding a process (folding, cutting, crease, binding, stitching) has been depressed on the user interface illustrated in FIG. 8C. If the instruction for adding a process has been given, the processing proceeds to S7102; if the instruction is not the instruction for adding a process, the processing proceeds to S7109.

In S7102, the control unit 5012 acquires any of the WF rules illustrated in FIGS. 6B to 6D stored in the rule storage unit 5017 through the WF rule defining unit 5014. The acquired WF rule is the WF rule corresponding to a type of a product selected on the user interface illustrated in FIG. 8B (e.g., if perfect binding has been selected, information "PerfectBinding01.xml" is acquired).

In S7103, the control unit 5012 determines whether the process selected for addition in S7101 exists in the process (ProcessID) of the WF rule acquired in S7102. If the process exists, the processing proceeds to S7105; if the process does not exist, the processing proceeds to S7104.

Figure 9:
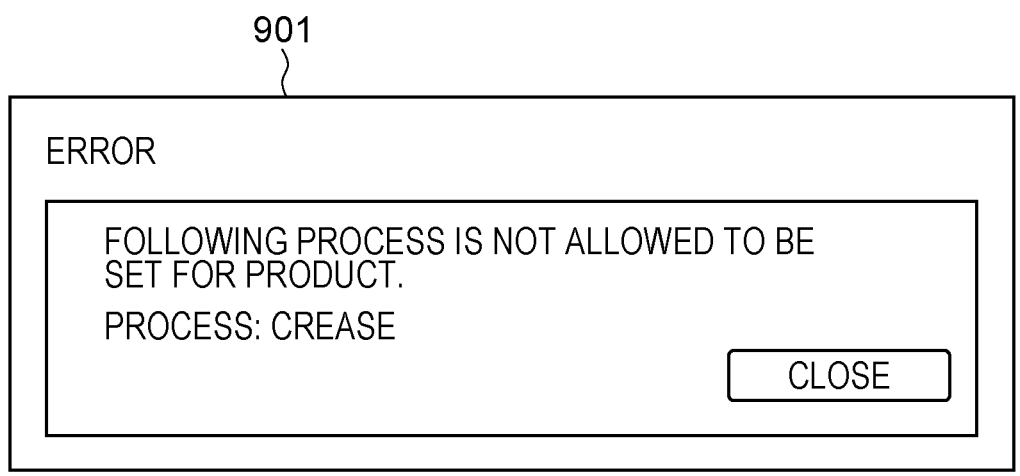
FIG. 9 illustrates an example of a user interface screen for a message displayed by a workflow management application of the information processing device according to the first example.

In S7104, the operation unit 5011 displays a user interface including an error message illustrated in FIG. 9.

In S7105, the control unit 5012 acquires order information (ProcessNo) of the process from the WF rule (e.g., in a case of a folding process of a body for perfect binding, "1" corresponding to a folding process is acquired from "PerfectBinding01.xml").

In S7106, on the basis of the order information (ProcessNo), the control unit 5012 inserts the process to the workflow. For example, on the user interface illustrated in FIG. 8C for perfect binding, a binding process (ProcessNo: "2") is inserted, and then a folding process (ProcessNo: "1") is designated. In this case, the folding process is inserted before the binding process as in a process icon 8007 in FIG. 8D.

Figure 8D:
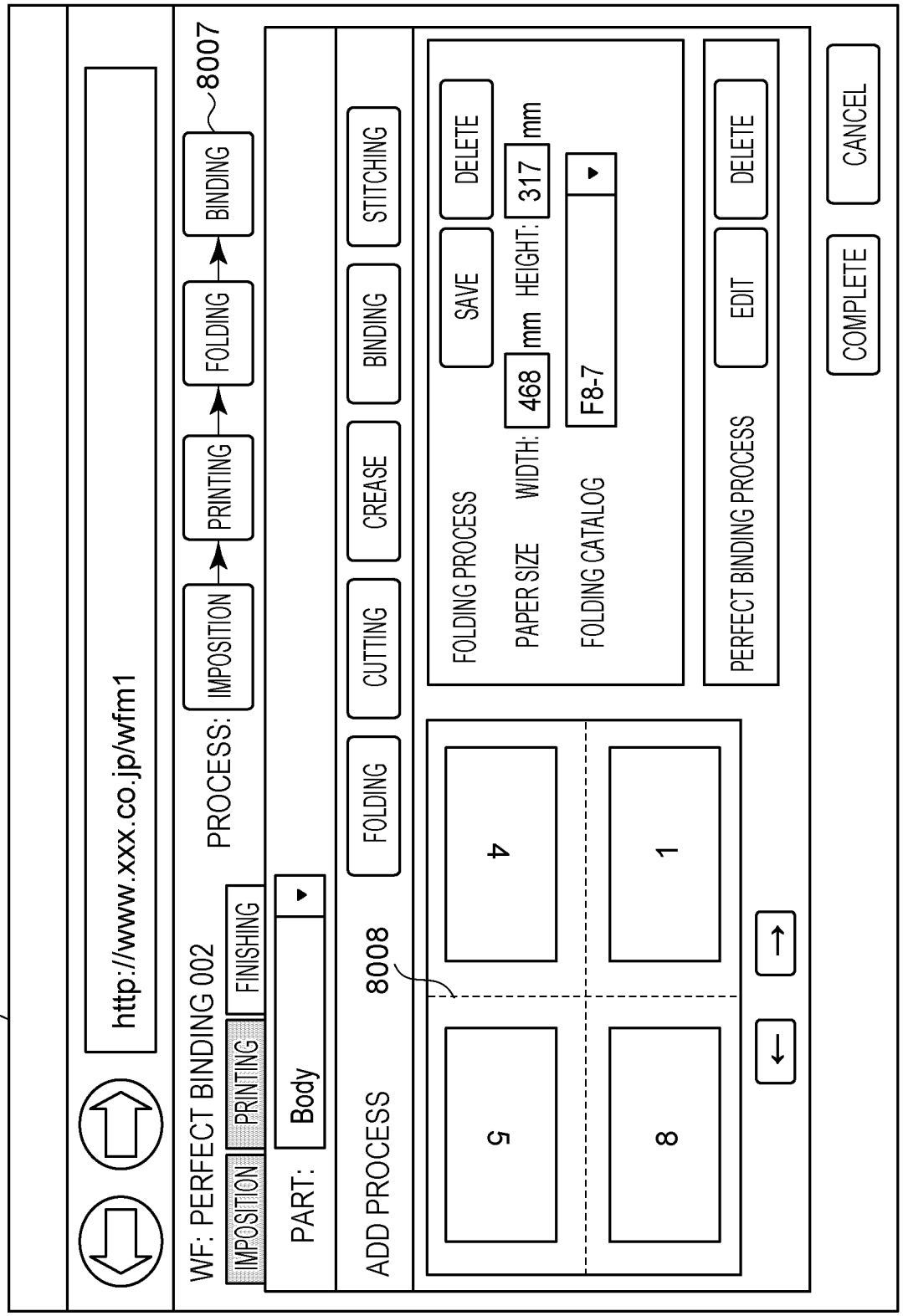
FIG. 8D illustrates an example of a user interface screen according to the first example.

In S7107, the operation unit 5011 displays a setting screen for setting a process on a user interface illustrated in FIG. 8D. If S7107 follows an editing instruction in S7109, which will be described later, attribute values that have been set are reflected.

In S7108, the operation unit 5011 determines whether the process setting in S7107 has been completed. That is, it is determined whether a "SAVE" button has been depressed on the user interface illustrated in FIG. 8D. If the process setting has been completed, the processing ends; if the process setting has not been completed, the processing proceeds to S7101.

In S7109, the operation unit 5011 determines whether the user has given an instruction for editing the finishing process that has been added in the workflow. Specifically, it is determined whether an "EDIT" button has been depressed on the user interface illustrated in FIG. 8D. If the instruction for editing the process has been given, the processing proceeds to S7107; if the instruction is not the instruction for editing the process, the processing proceeds to S7110.

In S7110, the operation unit 5011 determines whether the user has given an instruction for deleting the finishing process that has been added in the workflow. Specifically, it is determined whether a "DELETE" button has been depressed on the user interface illustrated in FIG. 8D. If the instruction for deleting the process has been given, the processing proceeds to S7111; if the instruction for deleting the process has not given, the processing proceeds to S7101.

In S7111, the control unit 5012 acquires any of the WF rules illustrated in FIGS. 6B to 6D stored in the rule storage unit 5017 through the WF rule defining unit 5014.

In S7112, the control unit 5012 deletes the delete target process from the workflow. At this time, as for processes other than the delete target, the values of process orders (ProcessNo) in the workflow illustrated in FIG. 10B, which will be described later, are updated in accordance with the WF rule. In response to this, a process icon 8002 in FIG. 8C is updated.

FIG. 7C is a flowchart illustrating a flow for processing an input job on the basis of the workflow created in FIG. 7A in the job management application 502 and the workflow management application 501. In FIG. 7C, in S7201, it is determined whether the job receiving unit 5023 has received a job for producing a product. If the job has been received, the processing proceeds to S7202. Note that the job includes at least a workflow ID (WF ID). In addition, the job includes information for identifying the product, the number of products or parts that form the product, information regarding a device that performs printing and finishing, such as a printing device or a finishing device, and due date information. The job is received from another device (input system) or is copied to a folder in the information processing device 101, for example.

In S7202, the control unit 5021 stores the job in the job storing unit 5026 through the job management unit 5024 and transmits information of the job to the WF processing unit 5015.

In S7203, it is determined whether the WF processing unit 5015 is to start to process the job. If the job processing is to start, the processing proceeds to S7204. The job processing may be started upon an instruction from the control unit 5021 to the WF processing unit 5015 in response to the user's instruction to the operation unit 5022, or may be automatically started according to schedule (timer) of the WF processing unit 5015. Upon start of the job processing, the WF processing unit 5015 starts the processing of the workflow for the job. Specifically, the WF processing unit 5015 instructs the control unit 5021 to execute the processes in accordance with the definition in the workflow list in FIGS. 10A and 10B.

In S7204, it is determined whether a pre-press process is included. If the pre-press process is included, the processing proceeds to S7205. In S7205, the control unit 5021 executes processing (pre-press) regarding the workflow in the information processing device 101. As the processing in the information processing device 101, for example, layout (imposition) processing or the like is performed. The control unit 5021 notifies the WF processing unit 5015 of an execution status and a result of the processing.

In S7206, the control unit 5021 transmits the job to the image forming device 102 or the finishing devices 104 and 105 through the job transmitting unit 5025 and the communication processing unit 5027. The control unit 5021 notifies the WF processing unit 5015 of the execution status of the processing (e.g., a printing progress and result in the image forming device 102 are received through the communication processing unit 5027 and are transmitted to the WF processing unit 5015).

Although this example has illustrated a method in which the WF processing unit 5015 of the workflow management application 501 controls the workflow for a job, the job management application 502 may control the workflow. That is, the workflow management application 501 may export workflow information, and the job management application 502 may import the workflow information to execute the workflow. The workflow may be executed by a job management application alone without operation of the workflow management application.

Workflow Management Screen User Interface

FIGS. 8A to 8H each illustrate an example of a user interface displayed during management of a workflow in the operation unit 5011 of the workflow management application 501 of the information processing device 101 in the information processing system according to this example. The user interface displayed during management of a workflow assists the user in producing a product in commercial printing though continued interaction.

FIG. 8H illustrates a user interface for managing the entirety of the workflow. By depressing a "NEW CREATION" button in FIG. 8H, a user can create a new workflow (the flowchart in FIG. 7A is executed).

FIG. 8A illustrates a user interface that is displayed in response to depression of the "NEW CREATION" button in FIG. 8H for creating a new workflow. On this interface, a workflow name can be input, a type of a product (product type, e.g., a cut sheet, a saddle stitched book, or a perfect bound book) can be selected, and parts to be included can be set.

FIG. 8B illustrates a screen that is displayed in response to depression of an "OK" button in FIG. 8A. This screen is for setting a flow of "Body" as a part in the workflow. FIG. 8B illustrates a state where no processes are yet to be set. The finishing tab is selected on the screen.

FIG. 8C illustrates a user interface for setting a finishing process in the workflow. The configuration of the user interface illustrated in FIG. 8C will be described. Reference numeral 8001 indicates a tab for selecting pre-press (imposition), press (printing), or post-press (finishing) as a process as a setting target in the workflow. Reference numeral 8002 indicates an icon representing the process that is set in the workflow. Processes are coupled by arrows in the order of processing. Reference numeral 8003 indicates a control for selecting a part (e.g., Cover, Body, Title Page, Jacket, or Obi) as a setting target. Reference numeral 8004 indicates a button for adding a process. Reference numeral 8005 indicates a preview region that visually expresses how the set details are reflected on the product (sheet). Reference numeral 8006 indicates a parameter setting region in which parameters in the process can be set. In addition, the parameter setting region includes a "SAVE" button and a "DELETE" button. The "SAVE" button is used for saving the setting for the process that is being set, and the "DELETE" button is used for deleting the process.

In the example in FIG. 8C, in the workflow for producing a perfect bound book, processes for pre-press (imposition) and press (printing) for a body part are already set in a pre-press (imposition) tab and a press (printing) tab indicated by reference numeral 8001. FIG. 8C illustrates a state where a post-press (finishing) process setting screen (a "FINISHING" tab is selected) is displayed. FIG. 8C also illustrates a screen for setting parameters for a perfect binding process, the screen being displayed in response to depression of a "BINDING" button.

FIG. 8D illustrates a user interface that is displayed if a "FOLDING" process is added according to an instruction in FIG. 8C. Reference numeral 8007 indicates a state where an icon of the folding process is inserted before the perfect binding process. That is, a body is printed as four leaves on a sheet, and a process for folding the body in four is inserted. In addition, a dashed line 8008 indicating the folding position is added to the preview region in FIG. 8D. In addition, an "EDIT" button and a "DELETE" button also exist. The "EDIT" button is used for editing a process that is not being set (when the "EDIT" button is depressed, another region is developed, and a control for setting parameters is displayed), and the "DELETE" button is used for deleting the process.

Figure 8E:
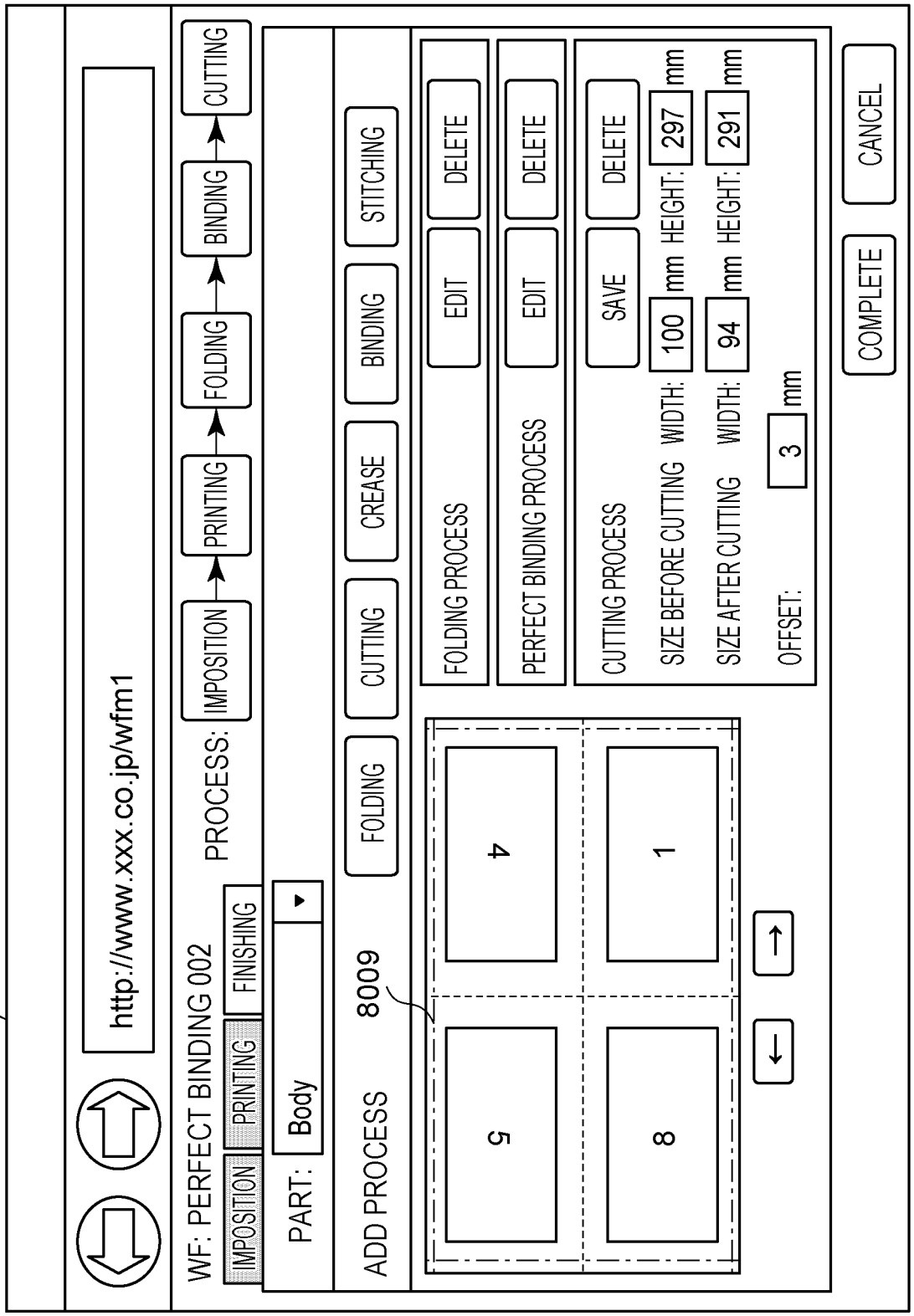
FIG. 8E illustrates an example of a user interface screen according to the first example.

FIG. 8E illustrates a user interface that is displayed if a "CUTTING" process is automatically inserted after the "BINDING" process as a result of further depression of a "CUTTING" button in FIG. 8D. That is, a process is inserted for cutting margins of a book in three directions, which are a top edge, a tail edge, and a fore edge, after binding. A chain line 8009 indicating the cutting position is further added to the preview region.

Figure 8F:
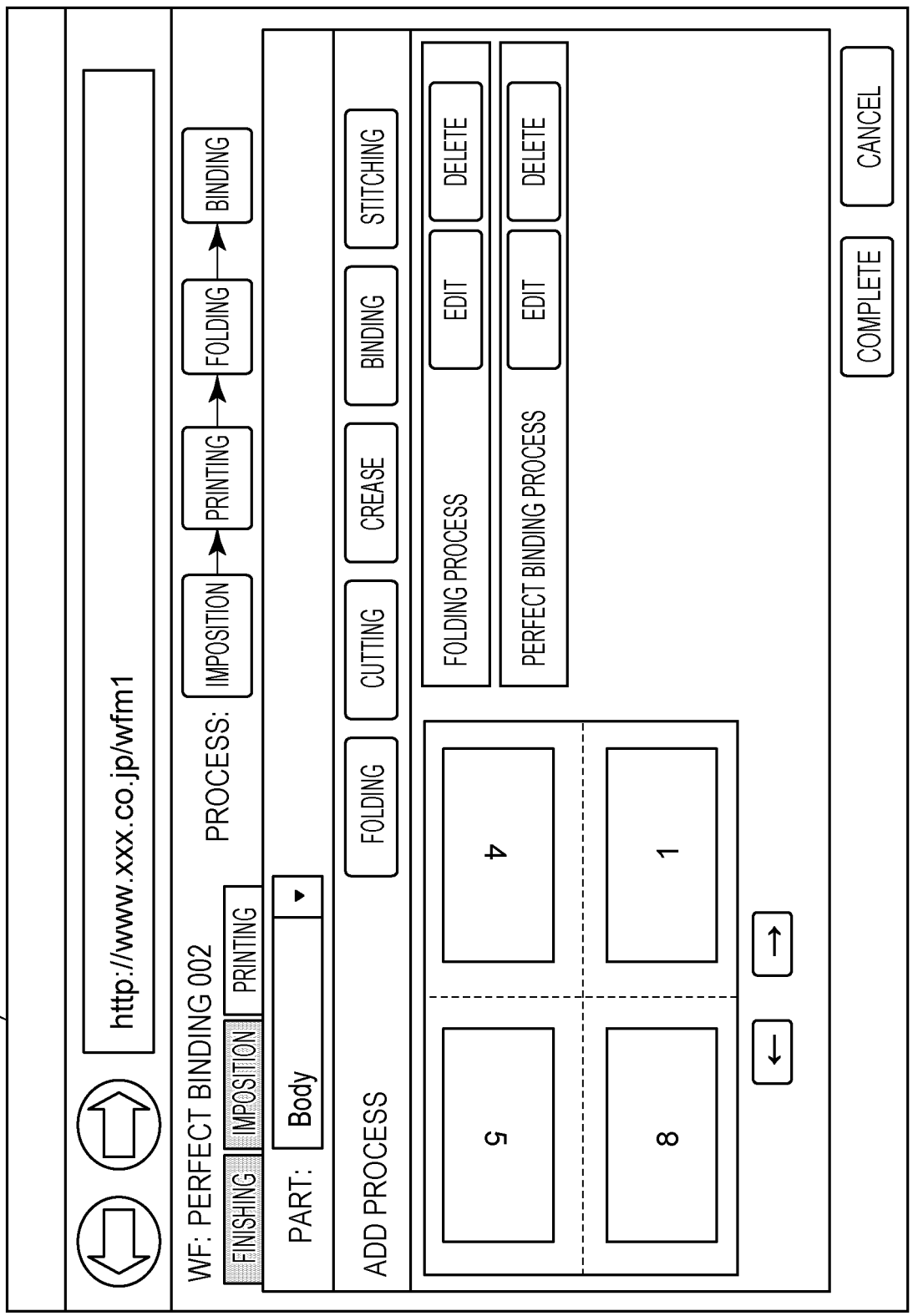
FIG. 8F illustrates an example of a user interface screen according to the first example.
Figure 8H:
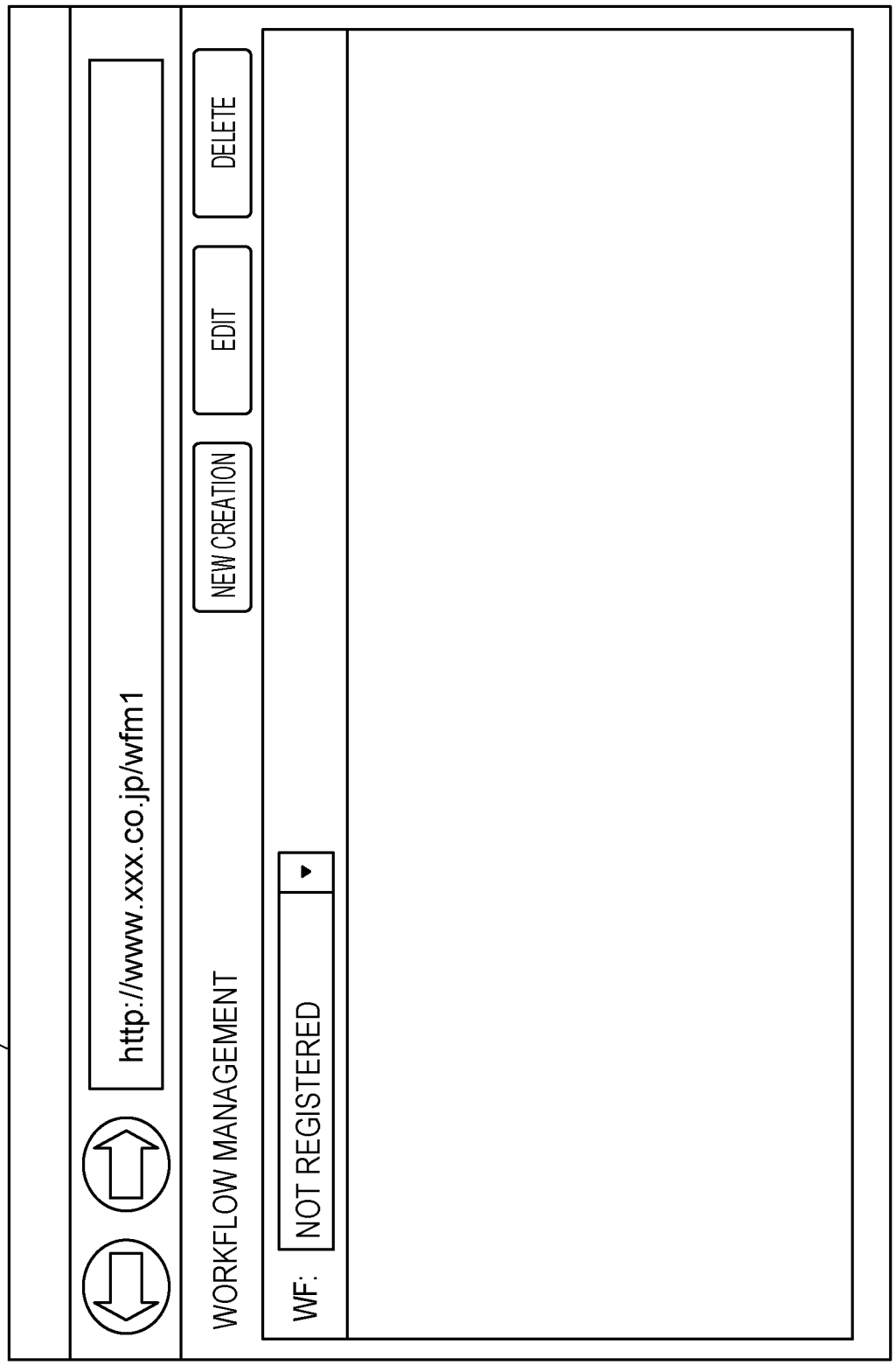
FIG. 8H illustrates an example of a user interface screen according to the first example.

FIG. 8F illustrates an example of a screen displayed in response to depression of the "DELETE" button for the cutting process in FIG. 8E. The cutting process is deleted, and also, the parameter setting region for the cutting process and the cutting position that have been displayed in the preview region are deleted.

FIG. 8G visually expresses (by coupling icons by arrows) the combination and order of the processes in the generated workflow. The example in FIG. 8G is a workflow for perfect binding (workflow name: "PERFECT BINDING 002"). The workflow is formed of a combination of processes (e.g., imposition, printing, folding, cutting, perfect binding, and creasing) for four parts (Body, Cover, Jacket, and Obi).

Message Screen User Interface

FIG. 9 illustrates an example of a user interface regarding a message screen displayed by the operation unit 5011 of the workflow management application 501 of the information processing device 101 in the information processing system according to this example.

In FIG. 9, an error message 901 is displayed if a user attempts to add a process that is not allowed to be added for a product. The error message 901 is displayed in S7104 in FIG. 7B.

Example of Workflow List Generated by Information Processing System

FIGS. 10A and 10B illustrate an example of a workflow list that is created by the WF management unit 5013 of the information processing device 101 in the information processing system according to this example and is stored in the WF storage unit 5016. The workflow list is created when the workflow setting is completed ("COMPLETE" button is depressed) on the operation unit 5011 in FIGS. 8A to 8H.

The workflow list is formed of a list of workflows (FIG. 10A) and a workflow file (FIG. 10B) that is linked from the list and in which details of a workflow are defined. A plurality of workflow files exist for each workflow (not illustrated).

In FIG. 10A, the list is formed of "WF ID" that is uniquely assigned to a registered workflow, "WF NAME" indicating the name of the workflow, and "WF FILE NAME" indicating the name of the workflow file.

In FIG. 10B, processes to be executed for each part (reference numeral 10001) are defined in the workflow. Reference numeral 10002 indicates the order of a process to be executed, reference numeral 10003 indicates the ID of the process, and reference numeral 10004 indicates attribute values in the process.

According to the example described above, by setting parameters (attribute values) for each process, a user is able to create and insert a process in a correct order of a workflow, and a workflow for producing a desired product can be established. The above-described human-machine interaction process assists the user to create a desired product by allowing a user to more conveniently create a workflow that, in turn, allows more convenient production of the desired product.

Second Example

The first example has disclosed an example of the present invention as a method in which the workflow management application 501 stores the rules (FIGS. 6A to 6D) for creating a workflow. However, the present invention is also applicable to a method in which the finishing application 503 stores the rules for creating a workflow. An example of a case where the finishing application 503 stores the rules for creating a workflow will be described below in detail in a second example with reference to drawings for parts different from that in the first example.

Software Configuration Example of Information Processing System

Figure 11:
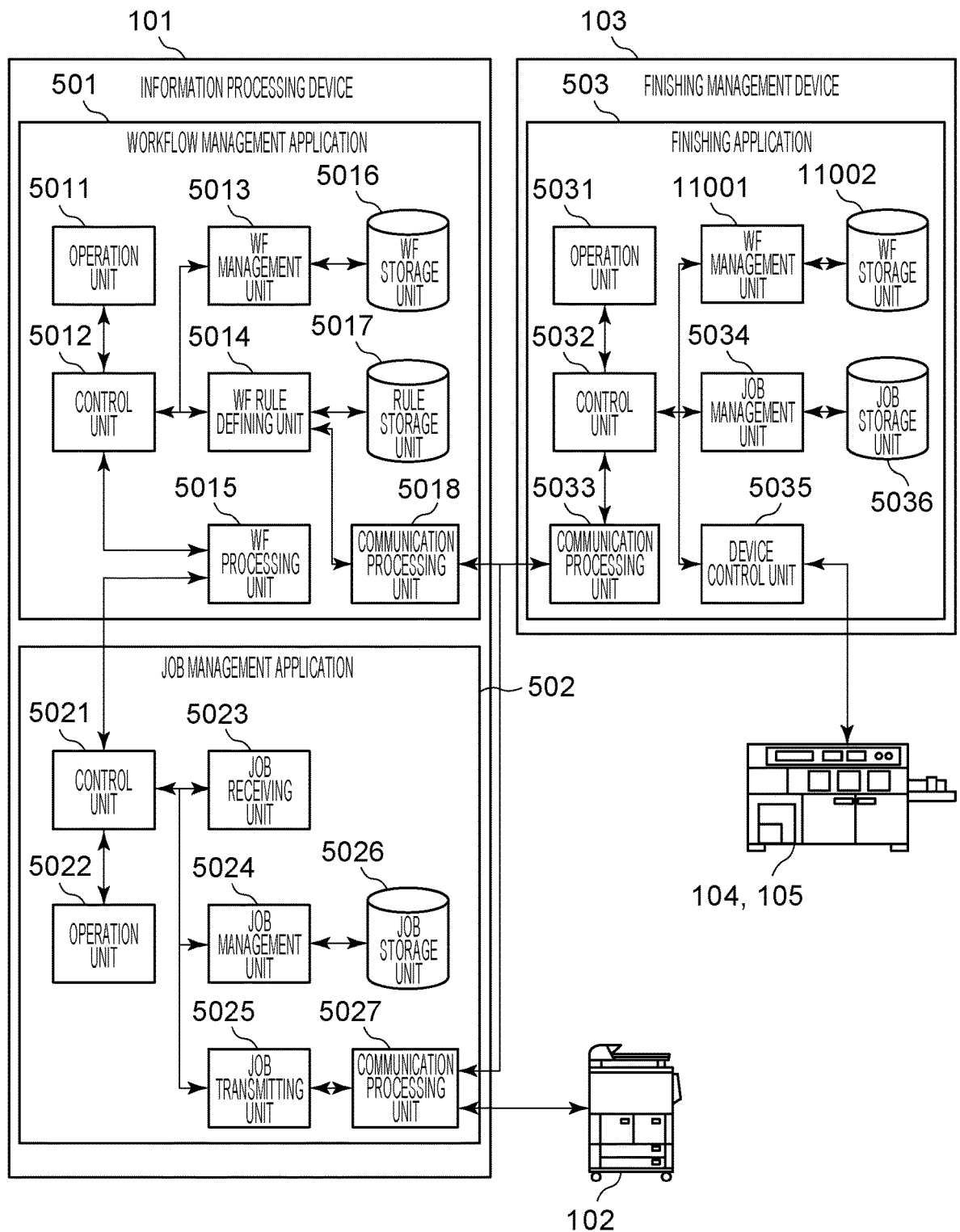
FIG. 11 is a block diagram illustrating a software configuration of an information processing device and a finishing management device according to a second example.

FIG. 11 is a functional block diagram illustrating the functions according to this example.

In the finishing application 503 of the finishing management device 103, a WF management unit 11001 is a workflow management unit. Specifically, the WF management unit 11001 manages a workflow list in the finishing devices 104 and 105 illustrated in FIGS. 17A and 17B, which will be described later, created by a user on the operation unit 5031. A WF storage unit 11002 is a workflow storage unit for storing the workflow list in the finishing devices 104 and 105 illustrated in FIGS. 17A and 17B on the basis of information received from the WF management unit 11001.

Examples of WF Rules Generated by Information Processing System

FIGS. 12A to 12D illustrate examples of WF rules in finishing. The WF rules are created by the WF rule defining unit 5014 of the information processing device 101 in the information processing system according to this example and stored in the rule storage unit 5017. The WF rule is used as a rule when the WF management unit 5013 generates a workflow.

In FIG. 12B, reference numeral 12001 indicates a process ID indicating the type of a process. The type of the process ID includes cutting (cutting process), stitching (saddle stitching process), folding (folding process), binding (perfect binding process), creasing (creasing process), and the like. Note that the same process may be defined a plurality of times for a product. For example, in a workflow for producing a perfect bound book, cutting (cutting process) is defined before and after binding (perfect binding process) (reference numerals 12005 and 12006 in FIG. 12D). The former process is a cutting process in units of a page in a case where a plurality of leaves are laid out on a sheet (multi-imposition printing). The latter process is a cutting process for unnecessary margins (top edge, tail edge, and fore edge) after the binding process. Reference numeral 12002 indicates a flag indicating whether a target process is a required process (process to be necessarily executed) (true) for producing a product or an optional process (process not to be necessarily executed) (false). Reference numeral 12003 indicates attributes. Parameters of the attributes (attribute values such as size of sheet) that are set for a target process may be automatically input on the basis of the parameter values of the following process. For example, in the cutting process in FIG. 12D, "PaperSize" (size of sheet) is defined. In this case, the parameters for the cutting process are automatically input on the basis of the parameters of "PaperSize" (size of sheet) for the following process, which is a creasing process. For example, if the size of sheet in the creasing process is designated as A4 size, A4 size is automatically set as the size of sheet in the cutting process. In FIG. 12C, reference numeral 12004 indicates the process (number) related to a target process. For example, in the example in FIG. 12C, cutting (Cutting) is defined as a related process of a stitching process (Stitching). In this case, if the stitching process is deleted from the workflow, this information is used by a user to determine whether the related cutting process is to be deleted from the workflow (confirmation message illustrated in FIG. 15B is displayed).

Processing Flowchart in Information Processing System

Figure 13A:
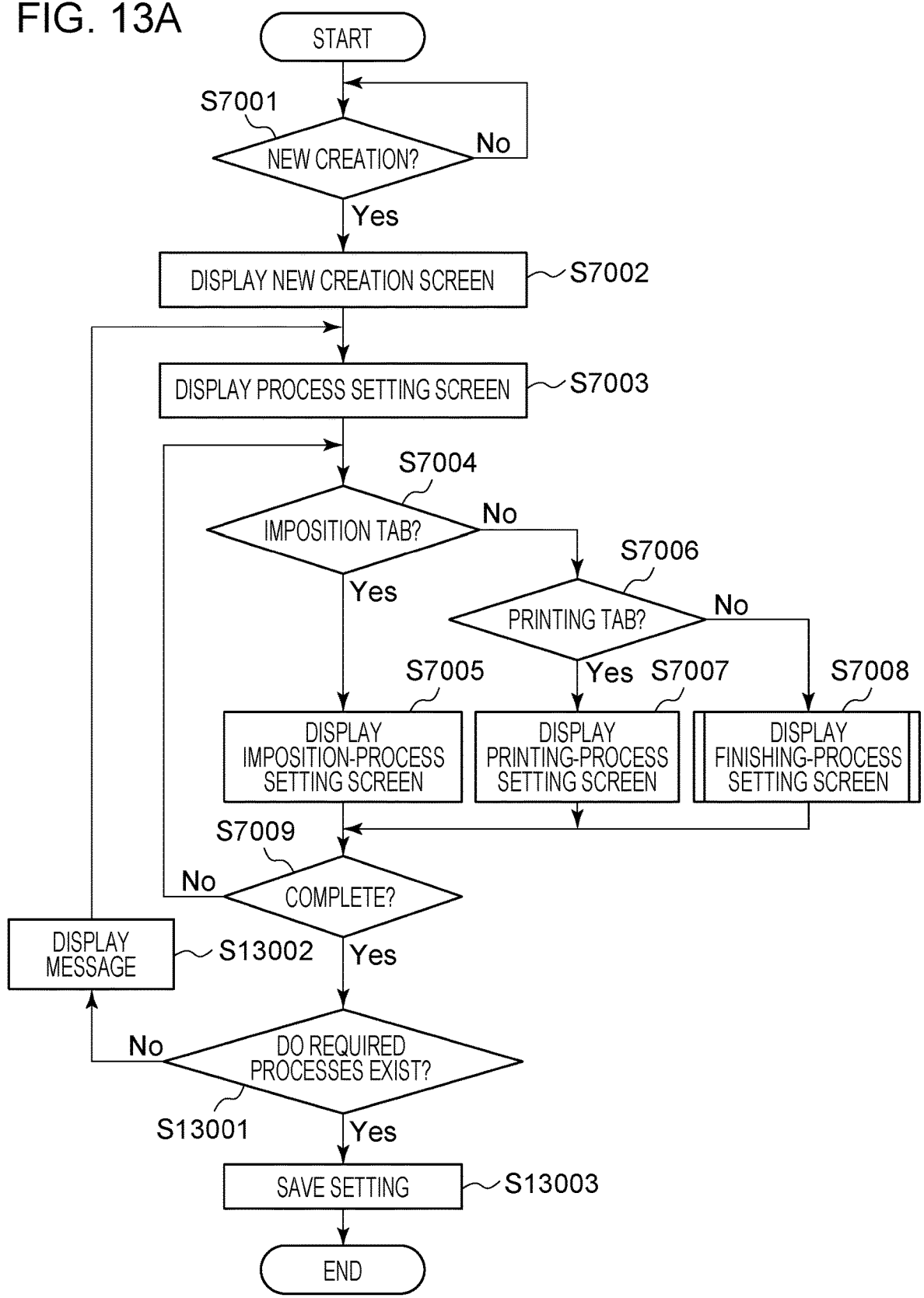
FIG. 13A is a processing flowchart of an information processing system according to the second example.
Figure 13B:
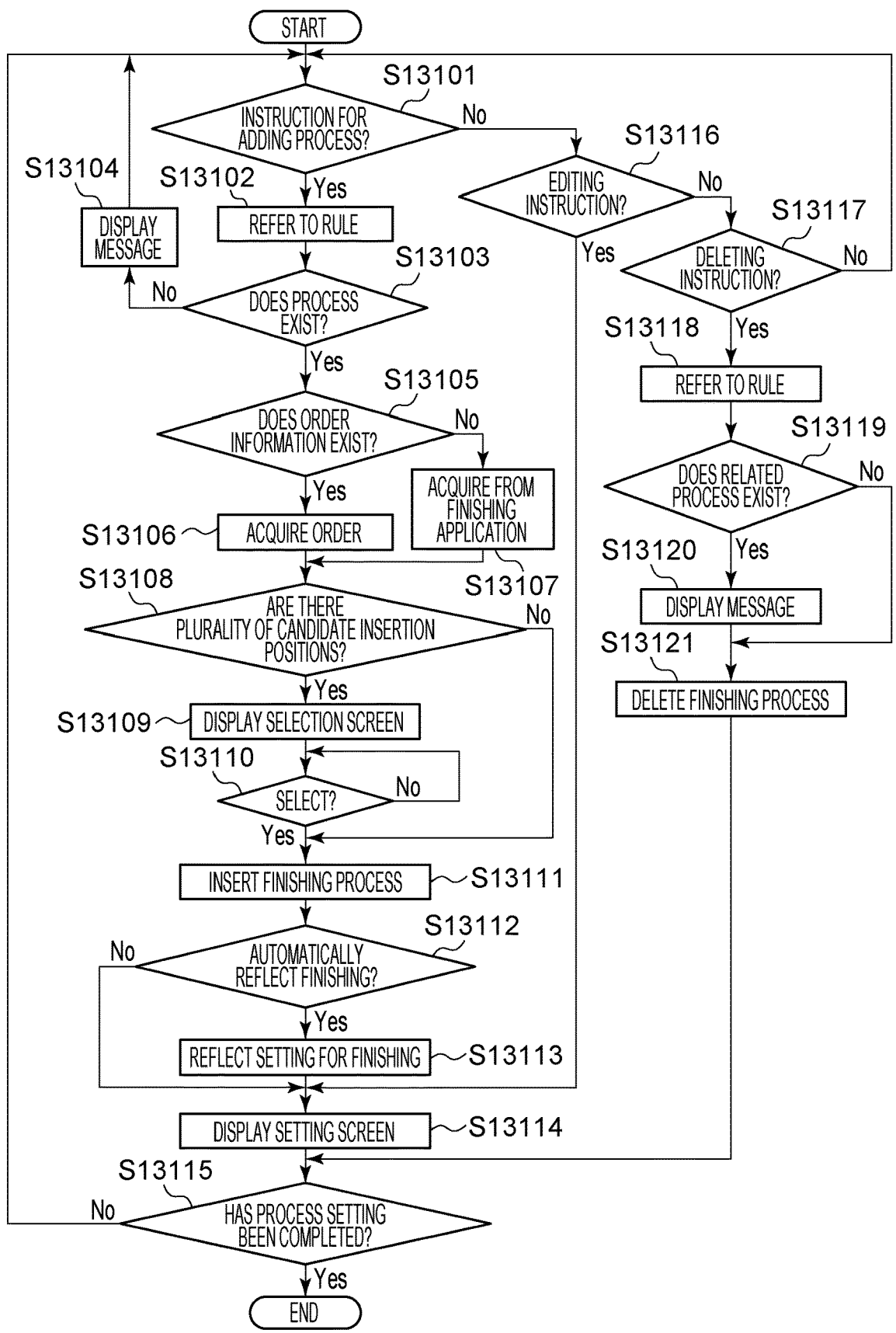
FIG. 13B is a processing flowchart of the information processing system according to the second example.

FIGS. 13A and 13B each illustrate a process flow for creating a workflow in the workflow management application 501 and the finishing application 503 in the information processing device 101 and the finishing management device 103 in the information processing system according to this example. Programs for the flows are stored in the ROM 203 of the information processing device 101 and are loaded to the RAM 202 and executed by the CPU 201.

FIG. 13A is a flowchart illustrating a process flow for creating a workflow in the workflow management application 501 and the finishing application 503.

In FIG. 13A, in S13001, the control unit 5012 determines whether all required processes exist in a workflow for which setting has been completed. That is, it is determined whether the required processes (Required: "true") for producing a product in the WF rule illustrated in FIG. 12A are all inserted to the workflow. If all the required processes exist, the processing proceeds to S13003; if not all the required processes exist, the processing proceeds to S13002.

Figure 15A:
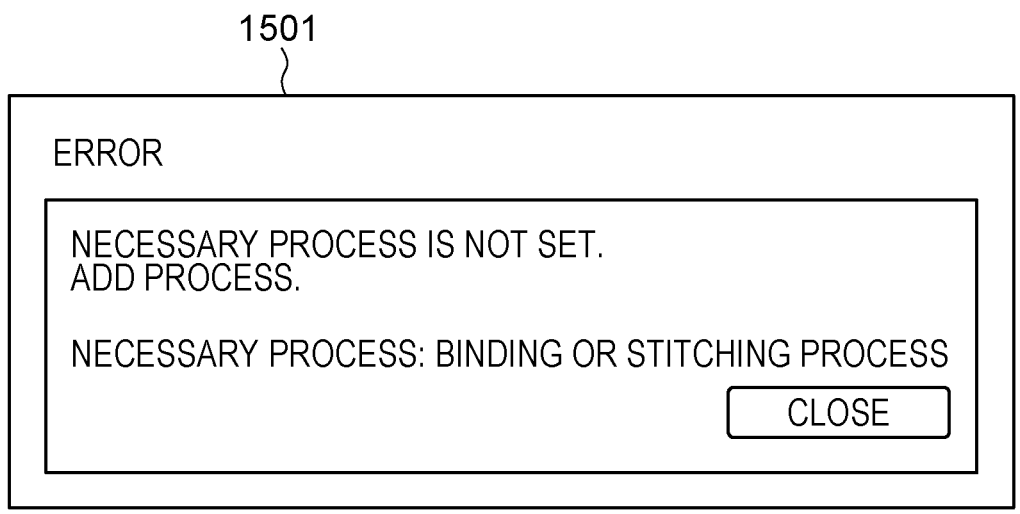
FIGS. 15A and 15B illustrate examples of user interface screens for a message displayed by a workflow management application of the information processing device according to the second example.
Figure 15B:
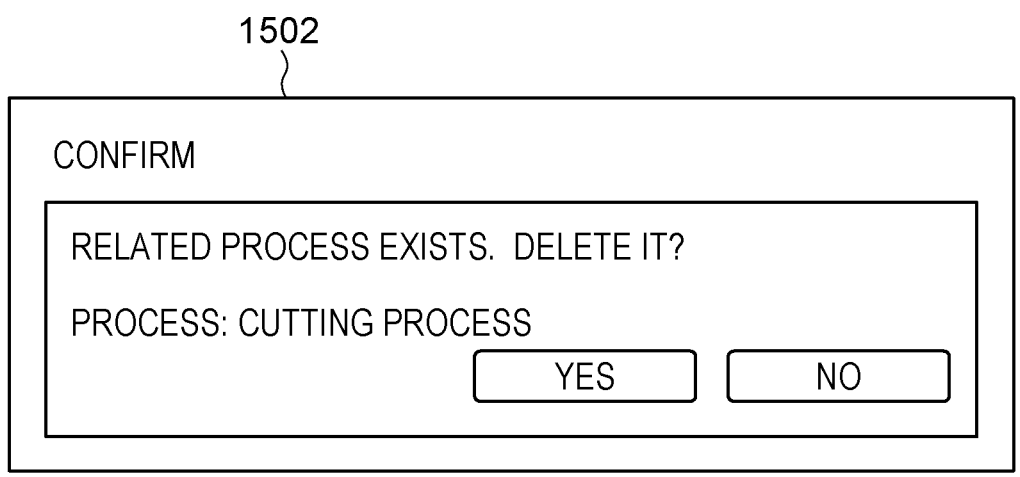

In S13002, the operation unit 5011 displays a user interface including an error message illustrated in FIG. 15A, and the processing proceeds to S7003.

In S13003, the control unit 5012 creates a workflow list illustrated in FIG. 16A and stores it in the WF storage unit 5016 through the WF management unit 5013.

FIG. 13B is a flowchart illustrating a process flow for setting the finishing process in S7008 in FIG. 13A.

In FIG. 13B, in S13101, the operation unit 5011 of the workflow management application 501 determines whether a user has given an instruction for adding the finishing process in the workflow. Specifically, it is determined whether a button for adding a process (folding, cutting, crease, binding, stitching) has been depressed on a user interface illustrated in FIG. 14A. If the instruction for adding a process has been given, the processing proceeds to S13102; if the instruction is not the instruction for adding a process, the processing proceeds to S13116.

In S13102, the control unit 5012 acquires the WF rule illustrated in FIG. 12A stored in the rule storage unit 5017 through the WF rule defining unit 5014. The acquired WF rule is the WF rule corresponding to a type of a product selected on the user interface illustrated in FIG. 8B (e.g., if perfect binding has been selected, information "PerfectBinding02.xml" is acquired).

In S13103, the control unit 5012 determines whether the process selected for addition in S13101 exists in the process (ProcessID) of the WF rule acquired in S13102. If the process exists, the processing proceeds to S13105; if the process does not exist, the processing proceeds to S13104.

In S13104, the operation unit 5011 displays a user interface including the error message illustrated in FIG. 9.

In S13105, the control unit 5012 determines whether order information (ProcessNo) of the WF rule acquired in S13102 for the process selected in S13101 exists. If the order information exists, the processing proceeds to S13106; if the order information does not exist, the processing proceeds to S13107.

In S13106, the control unit 5012 acquires order information of the process from the WF rule (e.g., in a case of a cutting process of a body for perfect binding, "1" and "4" corresponding to a cutting process are acquired from "PerfectBinding02.xml").

In S13107, the control unit 5012 acquires order information from the finishing management device 103 through the communication processing unit 5018. The communication processing unit 5018 creates a command 1801 illustrated in FIG. 18A and transmits it to the communication processing unit 5033 in the finishing application 503 of the finishing management device 103. The control unit 5032 in the finishing application 503 acquires the order information (ProcessNo) from the workflow list illustrated in FIGS. 17A and 17B stored in the WF storage unit 11002 through the WF management unit 11001. The communication processing unit 5033 creates a response command 1802 illustrated in FIG. 18B and transmits it to the communication processing unit 5018 in the workflow management application 501 of the information processing device 101.

In S13108, it is determined whether a plurality of pieces of the order information (ProcessNo) of the process acquired in S13106 or S13107 exist. If the plurality of pieces of the order information exist, the processing proceeds to S13109; if only the single piece of the order information exists, the processing proceeds to S13111. For example, in a case of the cutting process of a body for perfect binding, "1" and "4" exist, and thus the processing proceeds to S13109. This means that there are two candidate positions to which the cutting process is to be inserted in order to create a workflow.

In S13109, the operation unit 5011 displays a user interface illustrated in FIG. 14B. The user interface is used for designating the position to which the process is inserted.

In S13110, it is determined whether the position to which the process is inserted has been designated on the user interface displayed by the operation unit 5011 in S13109. If the insertion position has been designated, the processing proceeds to S13111.

In S13111, on the basis of the order information (ProcessNo), the control unit 5012 inserts the process to the workflow (e.g., in a case where the insertion position of the cutting process for perfect binding has been designated to a position before a binding process (ProcessNo: "1"), the cutting process is inserted to the position before the binding process (before ProcessNo: "3") as illustrated by a process icon 14001 in FIG. 14C).

In S13112, the control unit 5012 determines whether a parameter (attribute) that can be automatically input exists for the process that is inserted in S13111. That is, it is determined whether a parameter (attribute) exists in attributes that can be automatically input (AutoSetList) in the WF rule acquired in S13102. If the parameter that can be automatically input exists, the processing proceeds to S13113; if the parameter that can be automatically input does not exist, the processing proceeds to S13114.

Figure 14A:
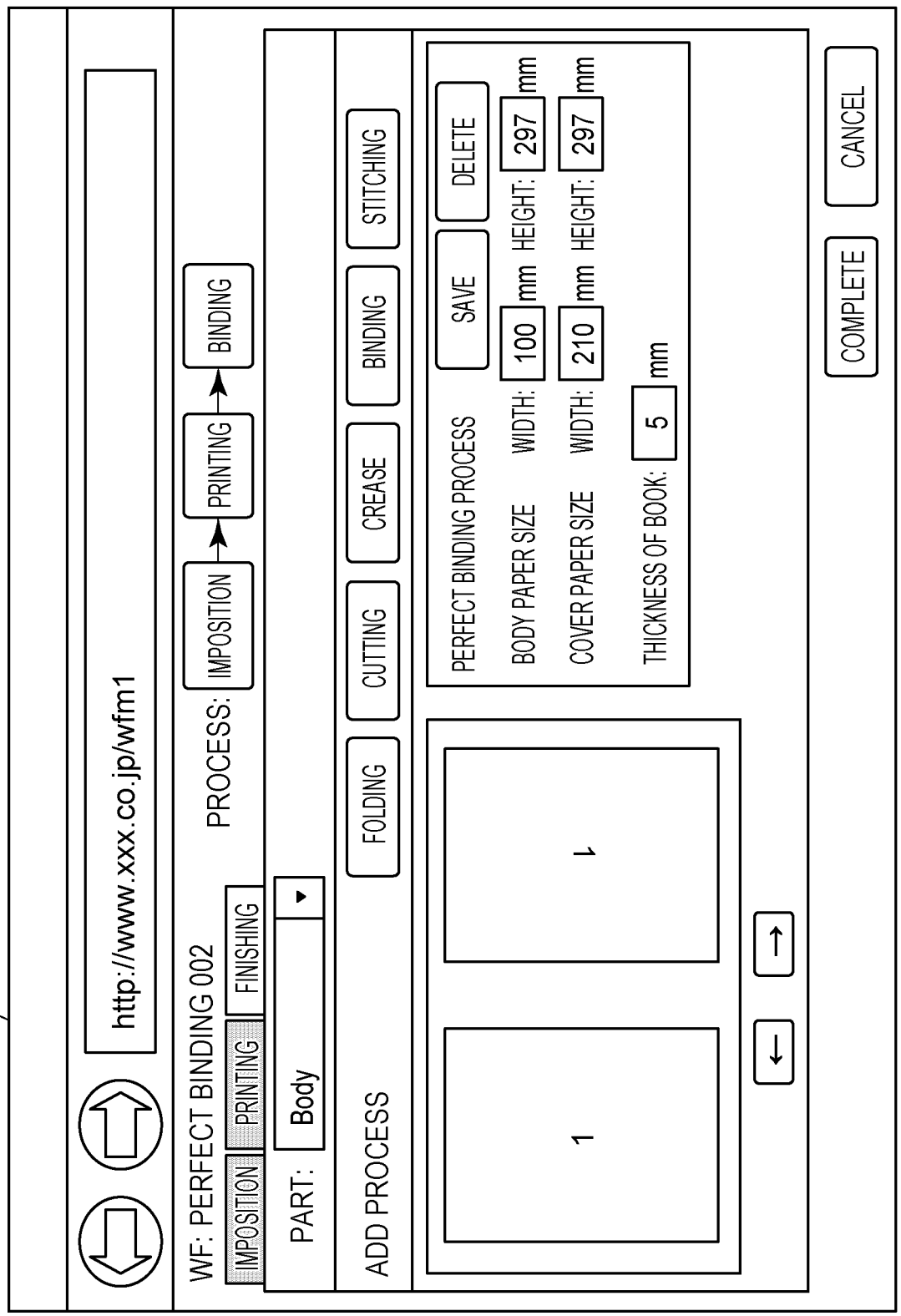
FIG. 14A illustrates an example of a user interface screen according to the second example.
Figure 14C:
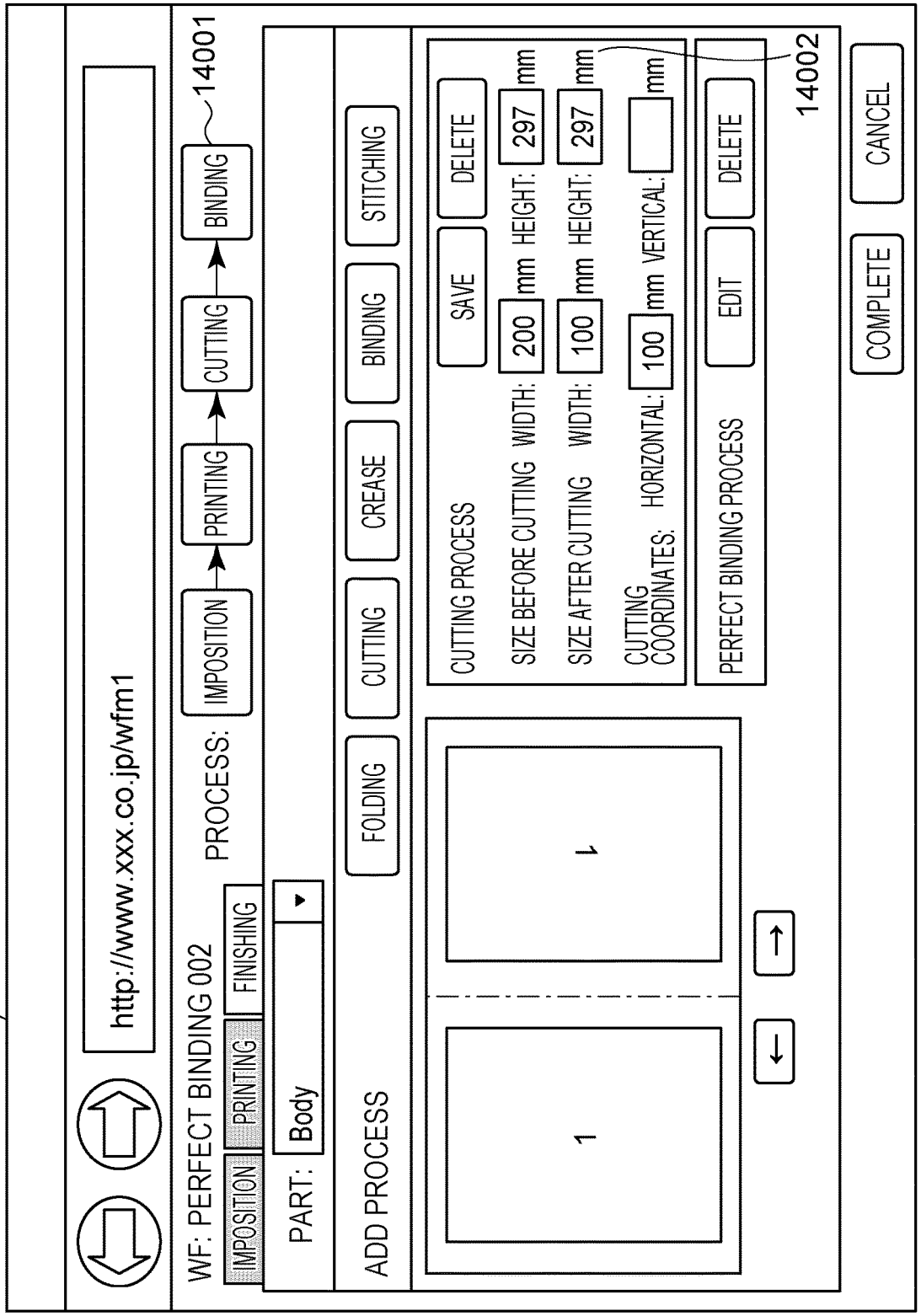
FIG. 14C illustrates an example of a user interface screen according to the second example.

In S13113, the control unit 5012 acquires the attribute values for a process that follows the inserted process and reflects the values in the attribute values of the inserted process (e.g., in a case of the cutting process inserted in S13111, on the basis of the attribute values (size of sheet and size of product) for the following binding process, the attribute values for the cutting process are automatically set as indicated by reference numeral 14002 in FIG. 14C.

In S13114, the operation unit 5011 displays a setting screen for setting parameters for the process on a user interface illustrated in FIG. 14C. At this time, the attribute values in S13113 are reflected. In addition, if S13114 follows an editing instruction in S13116, which will be described later, attribute values that have been set are reflected.

In S13115, the operation unit 5011 determines whether the process setting in S13114 has been completed. That is, it is determined whether a "SAVE" button has been depressed on the user interface illustrated in FIG. 14C. If the process setting has been completed, the processing ends; if the process setting has not been completed, the processing proceeds to S13101.

In S13116, the operation unit 5011 determines whether the user has given an instruction for editing the finishing process that has been added in the workflow. Specifically, it is determined whether an "EDIT" button has been depressed on the user interface illustrated in FIG. 14C. If the instruction for editing the process has been given, the processing proceeds to S13114; if the instruction is not the instruction for editing the process, the processing proceeds to S13117.

In S13117, the operation unit 5011 determines whether the user has given an instruction for deleting the finishing process that has been added in the workflow. Specifically, it is determined whether a "DELETE" button has been depressed on the user interface illustrated in FIG. 14C. If the instruction for deleting the process has been given, the processing proceeds to S13118; if the instruction for deleting the process has not given, the processing proceeds to S13101.

In S13118, the control unit 5012 acquires the WF rule illustrated in FIG. 12A stored in the rule storage unit 5017 through the WF rule defining unit 5014.

In S13119, the control unit 5012 determines whether a process (ReferenceProcess) related to the WF rule of the process to be deleted according to the instruction in S13117 exists. If the related process exists, the processing proceeds to S13120; if the related process does not exist, the processing proceeds to S13121.

In S13120, the operation unit 5011 displays a user interface including a confirmation message illustrated in FIG. 15B.

In S13121, the control unit 5012 deletes the delete target process from the workflow. At this time, as for processes other than the delete target, the values of process orders (ProcessNo) in the workflow illustrated in FIG. 16B, which will be described later, are updated in accordance with the WF rule. In response to this, process icons in FIGS. 14A to 14D are updated.

Workflow Management Screen User Interface

FIGS. 14A to 14D each illustrate an example of a user interface displayed during management of a workflow in the operation unit 5011 of the workflow management application 501 of the information processing device 101 in the information processing system according to this example.

FIG. 14A illustrates a user interface for setting a finishing process in a workflow. In the example in FIG. 14A, in the workflow for producing a perfect bound book, processes for pre-press (imposition) and press (printing) for a body part are already set in a pre-press (imposition) tab and a press (printing) tab. FIG. 14A illustrates a state where a post-press (finishing) process setting screen (a "FINISHING" tab is selected) is displayed. FIG. 14A also illustrates a screen for setting parameters for a perfect binding process, the screen being displayed in response to depression of a "BINDING" button.

FIG. 14B illustrates a user interface for designating an insertion position in a case where a plurality of candidate positions to which a process is to be inserted exist (the user interface displayed in S13109 in FIG. 13B). As a result of depression of a "CUTTING" button in FIG. 14A, there are two candidate positions to which the "CUTTING" process is to be inserted, which are before and after the "BINDING" process, and a screen in the example in FIG. 14B is displayed for designating the insertion position.

FIG. 14C illustrates a user interface that is displayed if the "CUTTING" process is designated to be inserted before the "BINDING" process in FIG. 14B. As illustrated as the process icon 14001, an icon of the cutting process is inserted before the binding process. That is, a process of cutting a body having two leaves on a sheet into two sheets is inserted. In addition, in FIG. 14C, setting values for the "CUTTING" process are automatically input on the basis of setting values for the following "BINDING" process (reference numeral 14002).

Figure 14D:
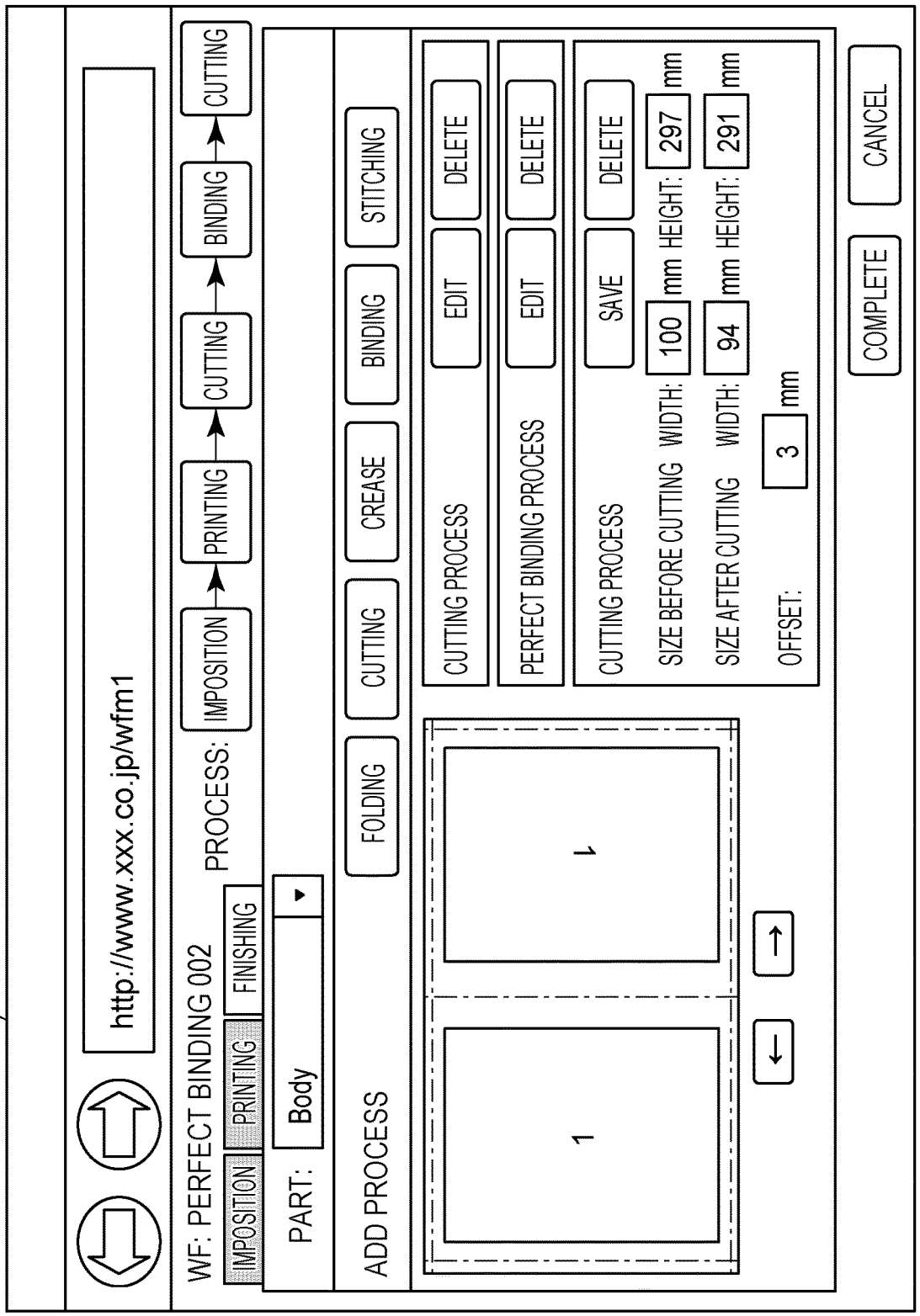
FIG. 14D illustrates an example of a user interface screen according to the second example.

FIG. 14D illustrates a user interface that is displayed if the "CUTTING" process is automatically inserted after the "BINDING" process as a result of further depression of the "CUTTING" button in FIG. 14C. That is, a process for cutting margins in three directions, which are a top edge, a tail edge, and a fore edge, after binding is inserted.

Message Screen User Interface

FIGS. 15A and 15B illustrate examples of user interfaces regarding a message screen displayed by the operation unit 5011 of the workflow management application 501 of the information processing device 101 in the information processing system according to this example.

FIG. 15A illustrates an error message that is displayed if any of the required processes is missing. The error message is displayed in S13002 in FIG. 13A.

FIG. 15B illustrates a message for confirming whether a related process is to be deleted if the related process of a delete target process exists. The message is displayed in S13120 in FIG. 13B.

Example of Workflow List Generated by Information Processing System

FIG. 16A illustrates an example of a workflow list that is created by the WF management unit 5013 of the information processing device 101 in the information processing system according to this example and is stored in the WF storage unit 5016. The workflow list is created when the workflow setting is completed ("COMPLETE" button is depressed) on the operation unit 5011 in FIGS. 14A to 14D.

FIG. 16B illustrates a workflow that is created in the examples illustrated in FIGS. 14A to 14D, and a cutting process is inserted to two positions (before and after a binding process) (reference numerals 16001 and 16002).

Example of Finishing-Device WF Rule Generated by Information Processing System FIGS. 17A and 17B illustrate an example of a finishing-device workflow rule list that is created by the WF management unit 11001 of the finishing management device 103 in the information processing system according to this example and is stored in the WF storage unit 11002. The finishing-device workflow rule list may be created in response to setting on a setting screen (not illustrated) on the operation unit 5031. Alternatively, the finishing-device workflow rule list may be automatically created when the control unit 5032 detects the finishing devices 104 and 105 connected to the finishing management device 103.

The finishing-device workflow list is formed of a list of workflow rules (FIG. 17A) and a workflow rule file (FIG. 17B) that is linked from the list and in which details of a workflow rule are defined. A plurality of workflow rule files exist for each workflow (not illustrated).

In FIG. 17A, the list is formed of "ID" that is uniquely assigned to a workflow rule and "RULE FILE NAME" indicating the name of the workflow rule file.

In FIG. 17B, the order of a process (reference numeral 17001), the ID of the process (reference numeral 17002), and the ID of a finishing device that executes the process (reference numeral 17003) are defined in the workflow rule.

Examples of Commands Generated by Information Processing System

FIGS. 18A and 18B illustrate examples of formats of a command and a response command that are generated by the communication processing units 5018 and 5033 of the information processing device 101 and the finishing management device 103 in the information processing system according to this example.

FIG. 18A illustrates a command generated by the communication processing unit 5018 of the information processing device 101 and used for acquiring workflow information. This command is transmitted in S13107 in the flowchart in FIG. 13B from the information processing device 101 to the finishing management device 103. FIG. 18A illustrates a command for acquiring a capability of a device by a "KnownDevices" key, in which processes to be acquired are listed in "Process".

FIG. 18B illustrates a response command to the above command in FIG. 18A. The response command is generated by the communication processing unit 5033 of the finishing management device 103. This command is transmitted in S13107 in the flowchart in FIG. 13B from the finishing management device 103 to the information processing device 101. In FIG. 18B, information corresponding to the processes designated in FIG. 18A (order of processes, process IDs, ID of the finishing device that executes the processes) is listed.

According to this second example, it is possible to generate an appropriate workflow by generating a workflow while determining whether required processes are set and whether a process can be set a plurality of times, for example.

According to the second example described above, by setting parameters (attribute values) for each process, the process can be inserted in a correct order on the basis of workflow information from the finishing management device. Also, a correct workflow for producing a product can be automatically established. Thus, it is possible to generate a workflow in a correct process order by only setting the processes without a user caring about the combination or order of the processes. The above-described human-machine interaction process assists the user to create a desired product by allowing a user to more conveniently create a workflow that, in turn, allows more convenient production of the desired product.

Although the above examples have described an example in which the operation unit includes a display unit, the operation unit and the display unit may be separated from each other. In addition, the user interface screens illustrated in the above examples are merely examples.

Although the above examples have described an example in which a plurality of workflows exist for a single product, a single workflow may correspond to a single product. In this case, ordering information may include information for identifying the product instead of the workflow ID, and the workflow corresponding to the product may be executed.

In addition, the input job may include the information for identifying the product instead of the workflow ID, and the workflow to be executed may be identified by using the information for identifying the product and other information included in the input job. The other information included in the input job is, for example, the number of products or the number of parts that form the product, information regarding the device that performs printing and finishing, such as the printing device and the finishing device, and due date information. A table in which the workflow ID and the information included in the input job are associated may be stored, and the workflow ID may be identified by using the table.

Other Examples

The present invention may also be realized as follows. That is, software (program) that realizes the functions in the examples described above is supplied to a system or device via a network or any storage medium, and a computer (or CPU, MPU, or the like) in the system or device reads and executes the program.

According to the examples described above, it is possible to provide a user interface that can generate a workflow without a user caring about the order of processes.

Example(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described example(s) and/or that includes one or more circuits (e.g., application specific integrated circuit (ASIC)) for performing the functions of one or more of the above-described example(s), and by a method performed by the computer of the system or apparatus by, for example, reading out and executing the computer executable instructions from the storage medium to perform the functions of one or more of the above-described example(s) and/or controlling the one or more circuits to perform the functions of one or more of the above-described example(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary examples, it is to be understood that the invention is not limited to the disclosed exemplary examples. The scope of the following claims is to be accorded the broadest interpretation so as to encompass all such modifications and equivalent structures and functions.

This application claims the benefit of Japanese Patent Application No. 2018-168165, filed Sep. 7, 2018, which is hereby incorporated by reference herein in its entirety.

What is claimed is:

1. An information processing device that generates a workflow by combining a plurality of work processes for producing a product, the information processing device comprising:
a storage configured to store rule information that identifies an order of a plurality of work processes used to produce a product;
one or more processors; and
a memory storing instructions, which when executed by the one or more processors, cause the information processing apparatus to perform operations comprising:
issuing an instruction to add the work process to a workflow based on user input on a work-process setting screen; and
generating a new workflow by inserting the work process, which was added by the issued instruction, into the workflow in the order identified by the rule information, without identifying the order of the work process by the user based on the rule information.

2. The information processing device according to claim 1, wherein the operations further comprise:
displaying the workflow to which the work process is added according to the instruction.

3. The information processing device according to claim 1,
wherein the work process includes at least a printing process and a process related to finishing after printing.

4. The information processing device according to claim 1,
wherein the operations further comprise displaying a setting screen for issuing an instruction for adding a work process and setting a parameter for the work process for each of the parts.

5. The information processing device according to claim 1,
wherein the work process includes at least a finishing process to be executed by a finishing device, and
wherein the parameter is at least a parameter for the finishing process.

6. The information processing device according to claim 1, wherein the operations further comprise:
generating a job for producing the product on the basis of the generated new workflow.

7. The information processing device according to claim 6,
wherein the job includes at least any one of information for identifying the product, the number of products or parts that form the product, a device that performs printing and finishing, and due date information of the product.

8. A method for controlling an information processing device that generates a workflow by combining a plurality of work processes for producing a product, the method comprising:
storing rule information that identifies an order of a plurality of work processes used to produce a product;
issuing an instruction to add the work process to a workflow based on user input on a work-process setting screen; and
generating a new workflow by inserting the work process, which was added by the issued instruction, into the workflow in the order identified by the rule information, without identifying the order of the work process by the user based on the rule information.

9. The method for controlling an information processing device according to claim 8, further comprising:
displaying, the workflow to which the work process is added according to the instruction.

10. The method for controlling an information processing device according to claim 8,
wherein the work process includes at least a printing process and a process related to finishing after printing.

11. The method for controlling an information processing device according to claim 8,
wherein the method further comprises displaying a setting screen for issuing an instruction for adding a work process and setting a parameter for the work process for each of the parts.

12. The method for controlling an information processing device according to claim 8,
wherein the work process includes at least a finishing process to be executed by a finishing device, and
wherein the parameter is at least a parameter for the finishing process.

13. The method for controlling an information processing device according to claim 8, further comprising:
generating a job for producing the product on the basis of the generated new workflow.

14. The method for controlling an information processing device according to claim 13,
wherein the job includes at least any one of information for identifying the product, the number of products or parts that form the product, a device that performs printing and finishing, and due date information of the product.

15. An information processing device comprising:
a storage configured to store rule information that identifies an order of a plurality of work processes used to produce a product;
one or more processors; and
a memory storing instructions, which when executed by the one or more processors, cause the information processing apparatus to perform operations comprising:
issuing an instruction for adding a work process to a workflow based on a user input on a work-process setting screen; and
generating a new workflow by inserting the work process, which was added by the issued instructions, into the workflow in the order identified by the rule information, without identifying the order of the work process by the user based on the rule information.

16. The information processing device according to claim 15, wherein the operations further comprise setting a parameter for the work process that is added according to the instruction on the setting screen on which the instruction for adding the work process is issued, and wherein, in accordance with the information for identifying an order of the plurality of work processes, the information processing device automatically adds the work process according to the instruction and generates a new workflow including information regarding the order of the work process and the set parameter for the work process.

* * * * *